United States Patent [19]
Burgoon

[11] Patent Number: 5,099,098
[45] Date of Patent: Mar. 24, 1992

[54] WELDING APPARATUS AND METHOD FOR WELDING A JOINT BETWEEN ABUTTING CIRCULAR WORKPIECES

[75] Inventor: Charles E. Burgoon, Kenosha, Wis.

[73] Assignee: Westinghouse Electric Corp., Pittsburgh, Pa.

[21] Appl. No.: 365,624

[22] Filed: Jun. 13, 1989

[51] Int. Cl.[5] .............................................. B23K 9/12
[52] U.S. Cl. ................................... 219/60 A; 219/75; 219/125.11
[58] Field of Search ...................... 219/125.11, 124.31, 219/124.32, 75, 136, 60 A, 61

[56] References Cited

U.S. PATENT DOCUMENTS

| | | | |
|---|---|---|---|
| 1,560,699 | 11/1925 | Kramer et al. | 219/124.32 |
| 3,084,244 | 4/1963 | Rieppel et al. | 219/60 A |
| 3,940,586 | 2/1976 | Stearns et al. | 219/75 |
| 4,260,869 | 4/1981 | Slavens et al. | 219/124.31 |
| 4,521,670 | 6/1985 | Case, Jr. et al. | |
| 4,531,040 | 7/1985 | Nawa et al. | |
| 4,532,406 | 7/1985 | Póvlick et al. | |
| 4,536,634 | 8/1985 | Nawa et al. | |
| 4,649,250 | 3/1987 | Kazlauskas | |
| 4,726,300 | 2/1988 | Kazlauskas | 219/60 A |
| 4,841,123 | 6/1989 | Novak et al. | 219/125.11 |

FOREIGN PATENT DOCUMENTS 300099 6/1981 Fed. Rep. of Germany .
284225 8/1971 U.S.S.R. .

OTHER PUBLICATIONS

Exhibits 1-16: Engineering drawings showing welding device commercially available from Dimetrics, Inc., located in Diamond Springs, Calif., a subsidiary of Talley Industries Company.

Primary Examiner—Clifford C. Shaw
Attorney, Agent, or Firm—Walter S. Stevens

[57] ABSTRACT

Arc welding apparatus and method for precisely welding abutting pipe end portions defining an interface having a seam or joint to welded. The apparatus includes a roller assembly for precisely rolling the apparatus around a track circumscribing one of the pipe portions so that the seam may be suitably welded. Connected to the roller assembly is a carriage which carries an electrode housing having an electrode housed therein. A gear rack is provided on the roller assembly for engaging a pinion gear on the carriage for precisely biasing the carriage and thus the electrode housing parallel to the longitudinal center axis of the pipe portions. Connected to the carriage is a lead screw assembly for precisely biasing the electrode housing and thus the electrode perpendicularly to the longitudinal center axis of the pipe portions to be welded. Connected to the electrode housing is a manipulator arm for precisely manipulating filler wire at the weld site.

12 Claims, 20 Drawing Sheets

WELDING APPARATUS AND METHOD FOR WELDING A JOINT BETWEEN ABUTTING CIRCULAR WORKPIECES

BACKGROUND OF THE INVENTION

This invention generally relates to welding apparatus and methods and more specifically relates to an arc welding apparatus and method for precisely welding a joint or seam between abutting pipe portions that may reside in a confined space.

It is known that arc welding consists of fusing or joining at least two pieces of metal by establishing a metallurgical bond between them. A portion of the pieces to be joined by the welding process are subjected to intense heat for transforming the metal into a liquid state, which liquified metal is then allowed to solidify to produce a fused joint between the pieces. The heat, which may approximate 6500 degrees Fahrenheit, is generated by an electric arc which is a sustained electrical discharge generated between the workpieces and an electrode that is held sufficiently close to the metal workpieces to be welded. To create the electric arc, an electric welding power supply is connected to the electrode for supplying electric current to the electrode and a ground lead is connected to the workpiece for completing the electric circuit. Moreover, filler metal in the form of filler wire may be used to fill a groove or a predetermined gap that may be defined by the pieces to be welded. Such a groove or predetermined gap, which is formed by machining and/or properly positioning the pieces to be welded, is designed to prevent weld cracking and angular distortion in the completed weldment. Moreover, such a groove or gap may be necessary to achieve full penetration in welds that are more than 0.125 inch thick. The filler metal, which is held adjacent to the electrode, is fed into the molten weld puddle created by the electric arc and is added to the groove or gap during the welding process. The filler metal forms an intermolecular bond between the melted filler metal and the base metal of the pieces to be welded.

It is important that the arc length, and thus the distance of the tip of the electrode to the workpiece, be precisely maintained during the welding process. An arc that is overly long dissipates heat into the surrounding atmosphere and may cause molten metal to be scattered or spattered. Dissipation of the heat into the surrounding atmosphere may also result in a colder fluid weld puddle which may in turn cause imperfections in the weld joint. Thus, an arc voltage control unit is used in many mechanized applications to maintain a constant arc gap. Moreover, the speed of welding will be slower in the instance of an overly long arc because a longer time will be required to melt the required amount of metal due to some of the heat energy being dissipated into the surrounding atmosphere rather than being absorbed by the workpiece. In addition, a long arc is more susceptible to arc blow than a short arc. Arc blow is the deviation or wobble of the arc due to magnetic flux generated in the electrode by the current flowing in the electrode. The presence of arc blow will cause the arc to be erratic and unstable. All the factors recited hereinabove determine the quality of the completed weldment.

As stated hereinabove, filler metal may be used to fill a groove or a predetermined gap defined by the pieces to be welded. When filler metal is used, it is preferable that the filler metal be precisely positioned with respect to the electrode, the arc and the weld puddle for producing a quality weld in a reasonable time. It is important to provide and maintain a suitable wire entry angle with respect to the electrode, the arc and the weld puddle. A suitable filler wire entry angle is generally considered in the art to be between 15 degrees and 45 degrees with respect to the work surface plane which is the plane perpendicular to the electrode. Factors that determine the selection of a suitable filler wire entry angle include the diameter of a gas cup which surrounds the electrode, the extent of electrode projection from the gas cup, the weld joint geometry, the filler wire material and also whether the weld is made on the inside of a pipe, the outside of the pipe, or on a flat plate. In order to obtain a suitable wire entry angle, many prior art devices require virtually hundreds of brackets and attachments having different sizes and configurations. Therefore, these prior art devices are typically time-consuming to install and adjust and are complicated and cumbersome to use. Typically, after the arc establishes a fluid puddle of melted metal, the filler metal is slowly added to the weld puddle.

In addition to providing a suitable filler metal entry angle, positioning the filler wire relative to the electrode and the weld puddle is also important. The filler metal, electrode, and direction of travel of welding preferably should all be substantially in the same plane with minimal side angle. In addition, the filler metal should not enter the arc stream; rather, the filler metal should be precisely placed in the envelope of a suitable shielding gas which is caused to flow around the electrode and the arc stream. The shielding gas, which may be an inert gas (e.g., helium, argon) or an inert gas mixed with a reactive gas (e.g., oxygen, carbon dioxide), is used to expedite the welding process and to obtain a high-quality weld by decreasing defects such as hydrogen embrittlement, underbead cracking, and porosity. Thus, it is important that the filler metal be precisely positioned in relation to the shielding gas, the workpiece, and the electrode for producing a quality weld in a reasonable time. Therefore, a problem in the art is to precisely position the filler metal in relation to the shielding gas, the electrode, and the workpiece for producing a quality weld in a reasonable time.

Of course, arc welding can be used to weld abutting ends of stationary pipe sections. Moreover, when used to weld abutting ends of stationary pipe sections, such devices may use a rail assembly mounted around the pipe, upon which rail assembly an electrode assembly, which grips the electrode, is in turn mounted. The electrode assembly, which holds the electrode, may then be moved on the rail around the pipe for producing the desired shape and quality of weld. Thus, it is important that the rail assembly be securely connected to the pipe so that the electrode assembly precisely moves around the rail for producing a quality weldment in a reasonable time. Therefore, another problem in the art is to precisely secure the rail assembly to the pipe and to precisely secure the electrode assembly to the rail assembly such that the electrode assembly will move on the rail around the pipe in a precise and predetermined manner for producing a quality weldment in a reasonable time.

Moreover, it may be required to perform the welding of the pipe portions in a confined space where the clearance for welding is limited. That is, the pipe portions to be welded may reside close to another pipe structure, an adjacent wall structure, nearby equipment, or other structures. Therefore, in such applications, it is preferable that the welding apparatus be configured to obtain a minimal volumetric envelope so that the required welding can be performed where clearances for welding are limited. Consequently, another problem in the art is to provide an apparatus for welding pipe sections where the clearance for welding is limited.

Devices for welding pipe sections are known. One such device is disclosed by U.S. Pat. No. 4,649,250 issued Mar. 10, 1987, in the name of Gasparas Kazlauskas entitled "Pipe Welder". The Kazlauskas patent discloses a pipe welder having a welding head housing. A welding electrode housing, upon which is mounted a welding electrode, is slidably mounted onto the welding head housing. The Kazlauskas device includes a hollow tube for guiding filler wire to the weld site. The aft end of the hollow tube is pivotally mounted onto a bracket and the bracket is mounted on a pin which is supported by an arm. The arm is pivotally mounted onto a different mounting bracket belonging to the pipe welder device. Filler wire is conducted through the hollow tube to a position directly adjacent the tip of the welding electrode.

A jig for butt welding or cladding pipes or shafts is disclosed by German Offenlegungsschirft 30-00-399 published June 19, 1981, in the name of Gebruder Sulzer AG. This device includes a welding burner that is mounted on a trolley driven in either direction around a workpiece and fitted with two wire feeders. According to this document, a circular rail made of hinged segments is detachably mounted on a round workpiece, and a trolley carrying a welding head is driven in either direction through 360 degrees around the rail.

Although the welding art discloses various devices for welding, the art does not appear to disclose an arc welding apparatus and method for precisely welding a joint or seam between abutting pipe portions that may reside in a confined space.

Therefore, there is clearly a need for an arc welding apparatus and method for precisely welding a joint or seam between abutting pipe portions which may reside in a confined space.

SUMMARY OF THE INVENTION

Disclosed herein are an arc welding apparatus and method for precisely welding abutting pipe end portions having an interface defining a seam or joint to be arc welded, which pipe end portions may reside in a confined space. The apparatus includes a roller assembly for precisely rolling the apparatus around a track so that the seam may be suitably welded. Connected to the roller assembly is a carriage which carries an electrode housing having an electrode extending therefrom. A pinion gear is provided on the roller assembly for engaging a rack on the carriage for precisely biasing the carriage and thus the electrode housing and the electrode in a direction parallel to the longitudinal center axis of the pipe portions. Connected to the carriage is a lead screw assembly for precisely biasing the electrode housing and thus the electrode in a direction perpendicular to the longitudinal axis of the pipe portions to be welded. Connected to the electrode housing is a manipulator arm for precisely manipulating filler wire at the weld site.

An object of the present invention is to provide an apparatus for welding a joint between abutting circular workpieces.

Another object of the present invention is to provide an apparatus for welding a joint between abutting circular workpieces defining a longitudinal center axis through the workpieces, the apparatus having an electrode for welding the joint, the apparatus including housing means connected to the electrode for housing the electrode, biasing means connected to the housing means for biasing the housing means along an axis perpendicular to the longitudinal axis of the workpieces, carrier means connected to the housing means for carrying the housing means, and roller means connected to the means for biasing the carrier means around an axis always parallel to the longitudinal axis of the workpieces.

A further object of the present invention is to provide adjustable guide means circumscribing one of the workpieces and engaging the roller means for precisely guiding the roller means around the workpiece circumscribed by the guide means.

Yet another object of the present invention is to provide adjustable manipulator means connected to the housing means for manipulating filler wire.

These and other objects of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENTS

First Embodiment of the Invention

As stated hereinabove, it is often necessary to precisely weld a joint or seam between abutting pipe portions that may reside in a confined space. In this regard, it is important that the arc length, and thus the distance of the tip of the electrode to the workpiece, are precisely maintained during the welding process so that a quality weld is obtained in a reasonable time. It is also important that the filler metal be precisely positioned in relation to the electrode, the shielding gas and the workpiece for producing a quality weld in a reasonable time. Moreover, it is preferable that the welding apparatus obtain a minimal or reduced volumetric envelope to perform the required welding in a confined space where clearances for welding may be limited. Described herein are an arc welding apparatus and a method for precisely welding a joint or seam between abutting pipe portions that may reside in a confined space.

Figure 1:
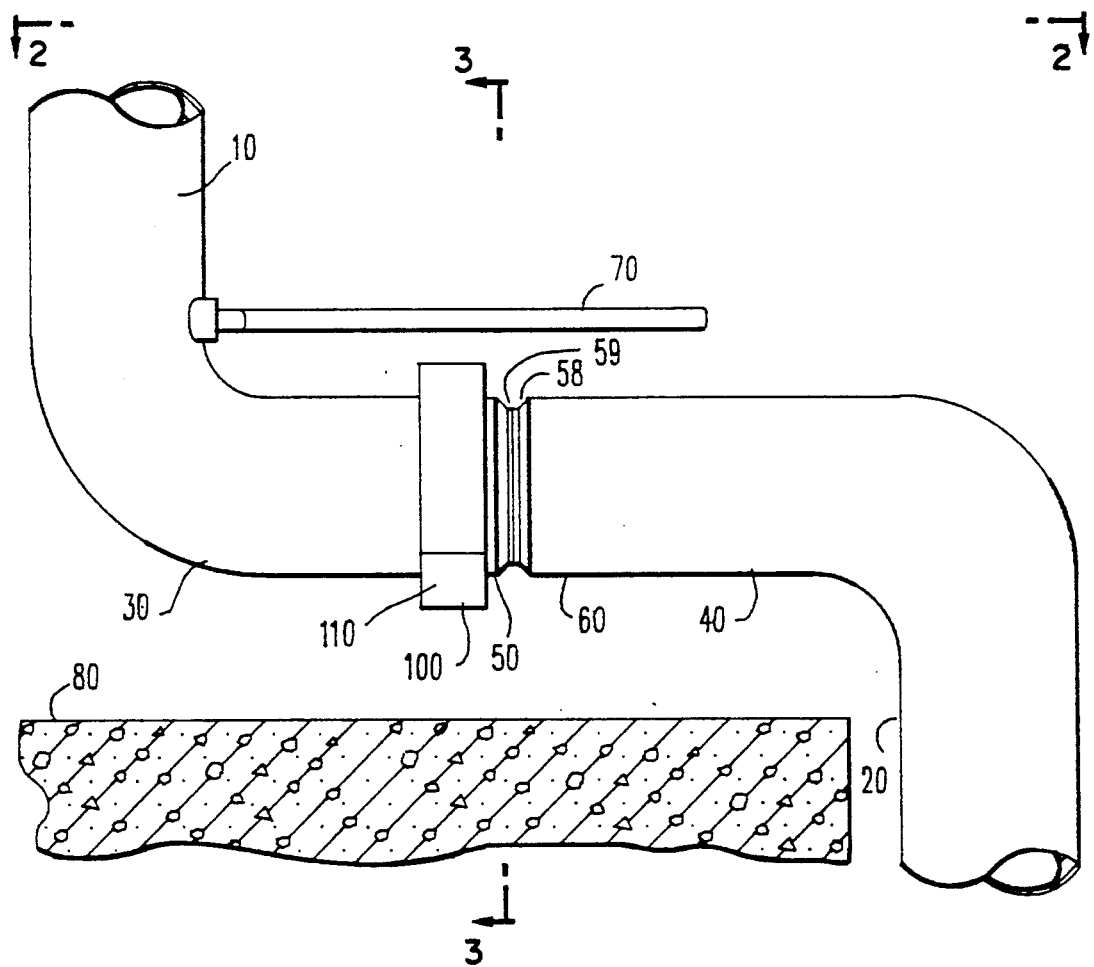
FIG. 1 illustrates abutting pipe end portions to be welded, one of which end portions is surrounded by a circular track for guiding an arc welding apparatus therearound.
Figure 2:
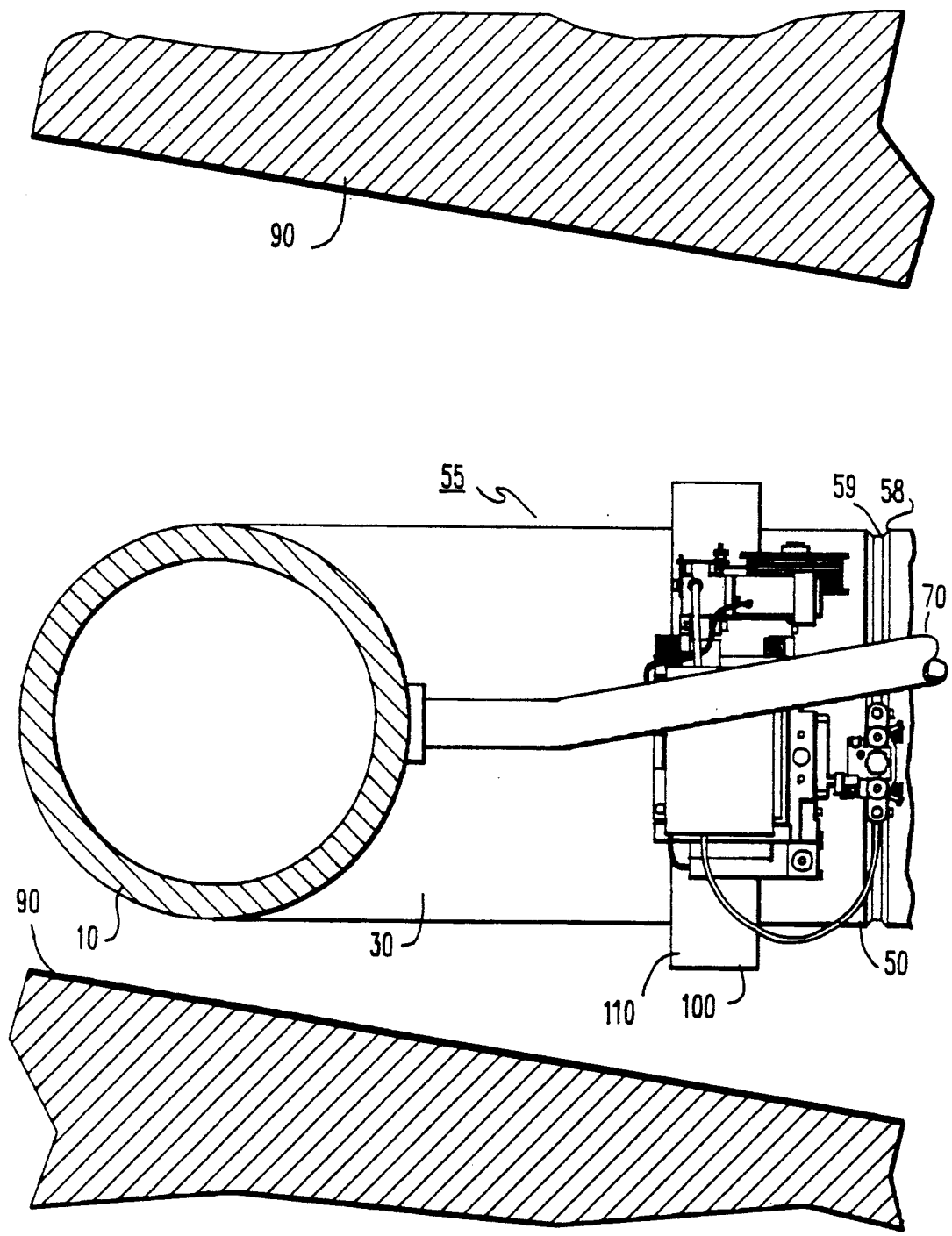
FIG. 2 illustrates in plan view the welding apparatus disposed on the track for rolling therearound and shows the pipe end portions residing in a confined space.
Figure 3:
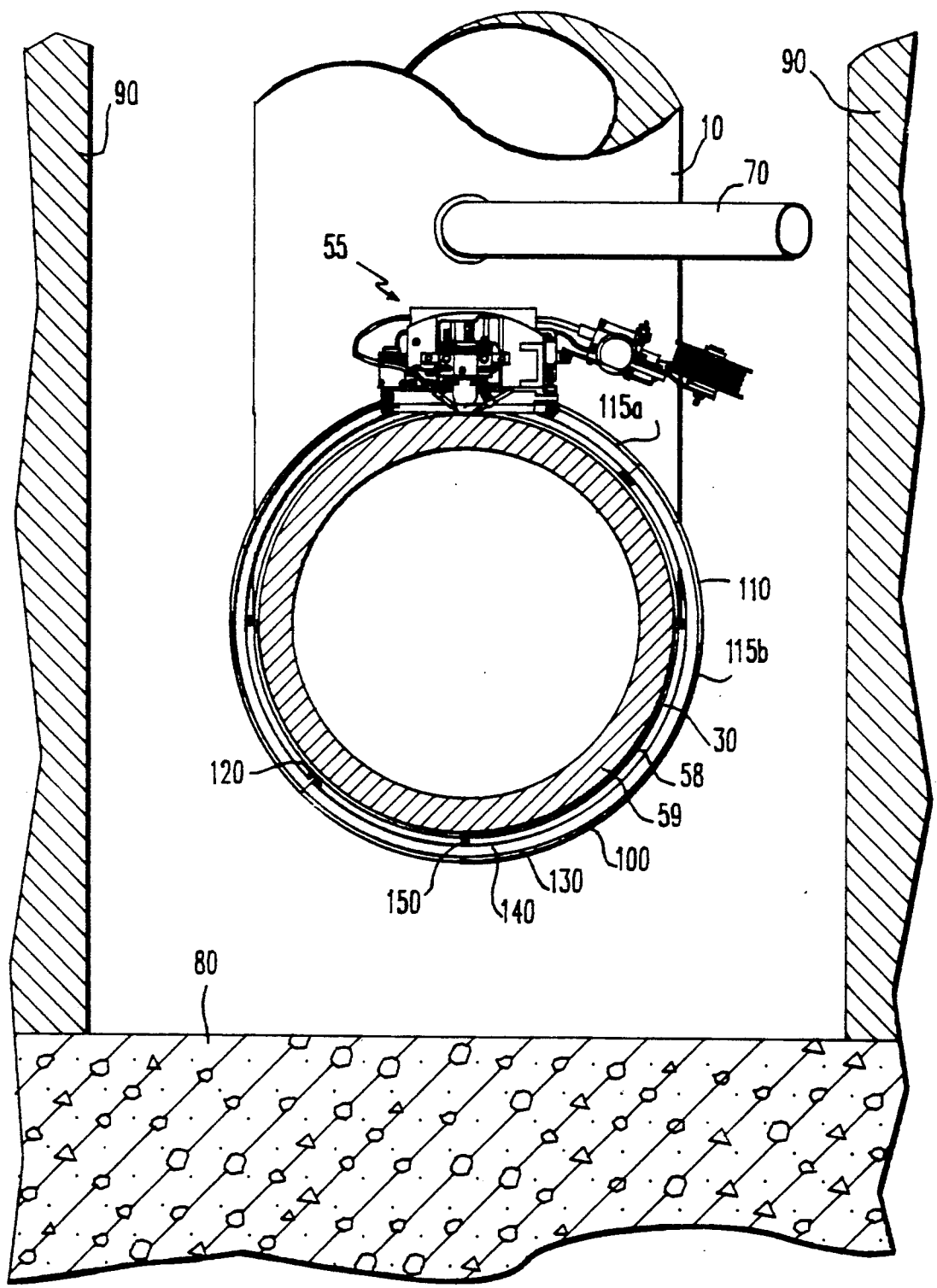
FIG. 3 is a view taken along section III—III of FIG. 1 showing the welding apparatus disposed on the track in the confined space.

Referring to FIGS. 1, 2, and 3, a metallic first pipe 10 and a metallic second pipe 20 are shown having a first pipe portion 30 coaxially aligned with a second pipe portion 40, respectively. It will be appreciated that pipe portions 30 and 40 define a longitudinal center axis therethrough. First pipe portion 30 and second pipe portion 40 have abutting pipe end portions 50 and 60, respectively, to be welded by an arc welding apparatus generally referred to as 55. As described in more detail hereinbelow, welding apparatus 55 includes an electrode housing 56 having an electrode 57 extending therefrom (see FIG. 15). As shown in FIGS. 1, 2, and 3, abutting pipe end portions 50 and 60 may be machined such that they define a generally V-shaped groove or recess 58 which circumscribes pipe end portions 50 and 60 for minimizing cracking and angular distortion in the completed weldment (not shown) by filling-out recess 58 with successive weld beads (not shown). Recess 58 may in turn define a land 59 which includes a seam to be welded, which seam is at the interface of abutting pipe end portions 50 and 60. Moreover, first pipe portion 30 and second pipe portion 40 may be located in a confined space. For example, located proximate first pipe portion 30 and second pipe portion 40 may be an overhead structure (e.g., a fluid sampling pipe 70 connected to first pipe 10) and a floor 80. In addition, located proximate first pipe portion 30 and second pipe portion 40 may be one or more side walls 90. Structures such as sampling pipe 70, floor 80, and side wall 90 individually or collectively define a confined space surrounding first pipe portion 30 and second pipe portion 40, which confined space may limit the space available to welding apparatus 55. Therefore, it is important that welding apparatus 55 is capable of defining a minimal volumetric envelope for welding in the confined space.

Figure 4:
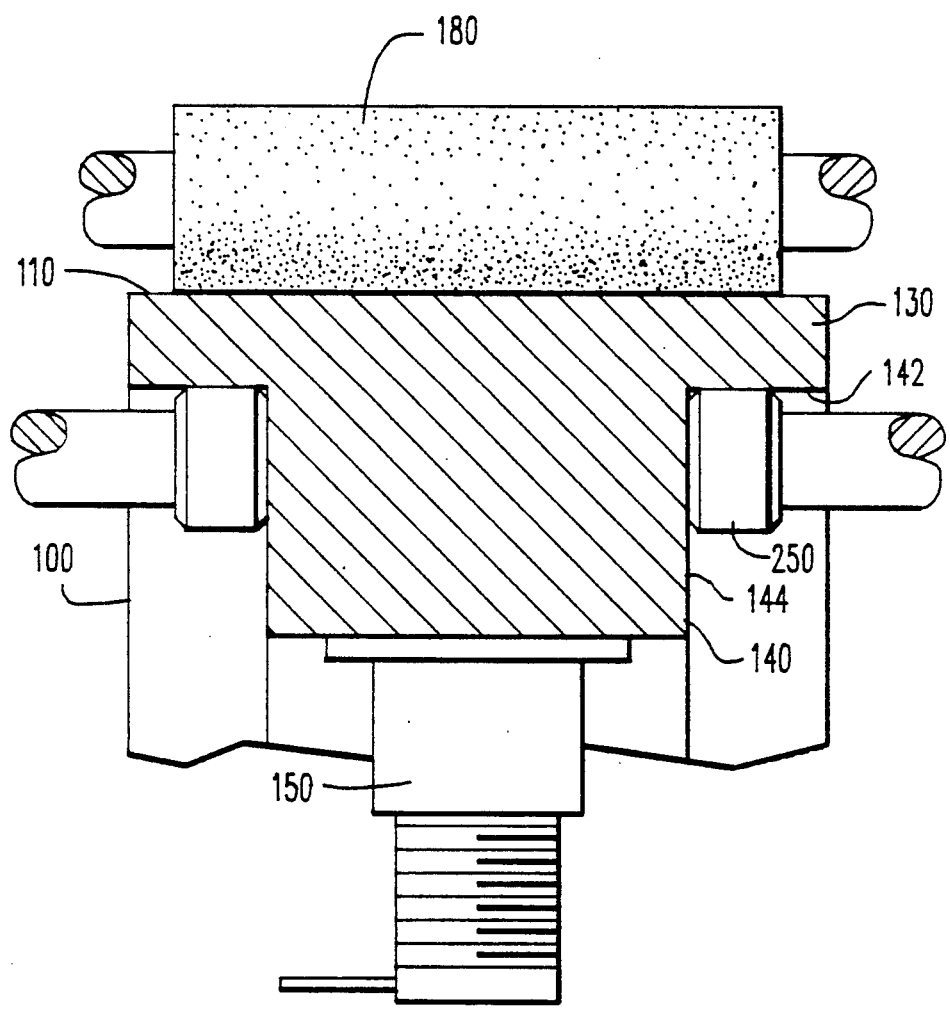
FIG. 4 illustrates in partial vertical section one of a plurality of rollers resting on the track and a plurality of low-friction wheels engaging the track, the rollers and the wheels belonging to the welding apparatus.
Figure 5:
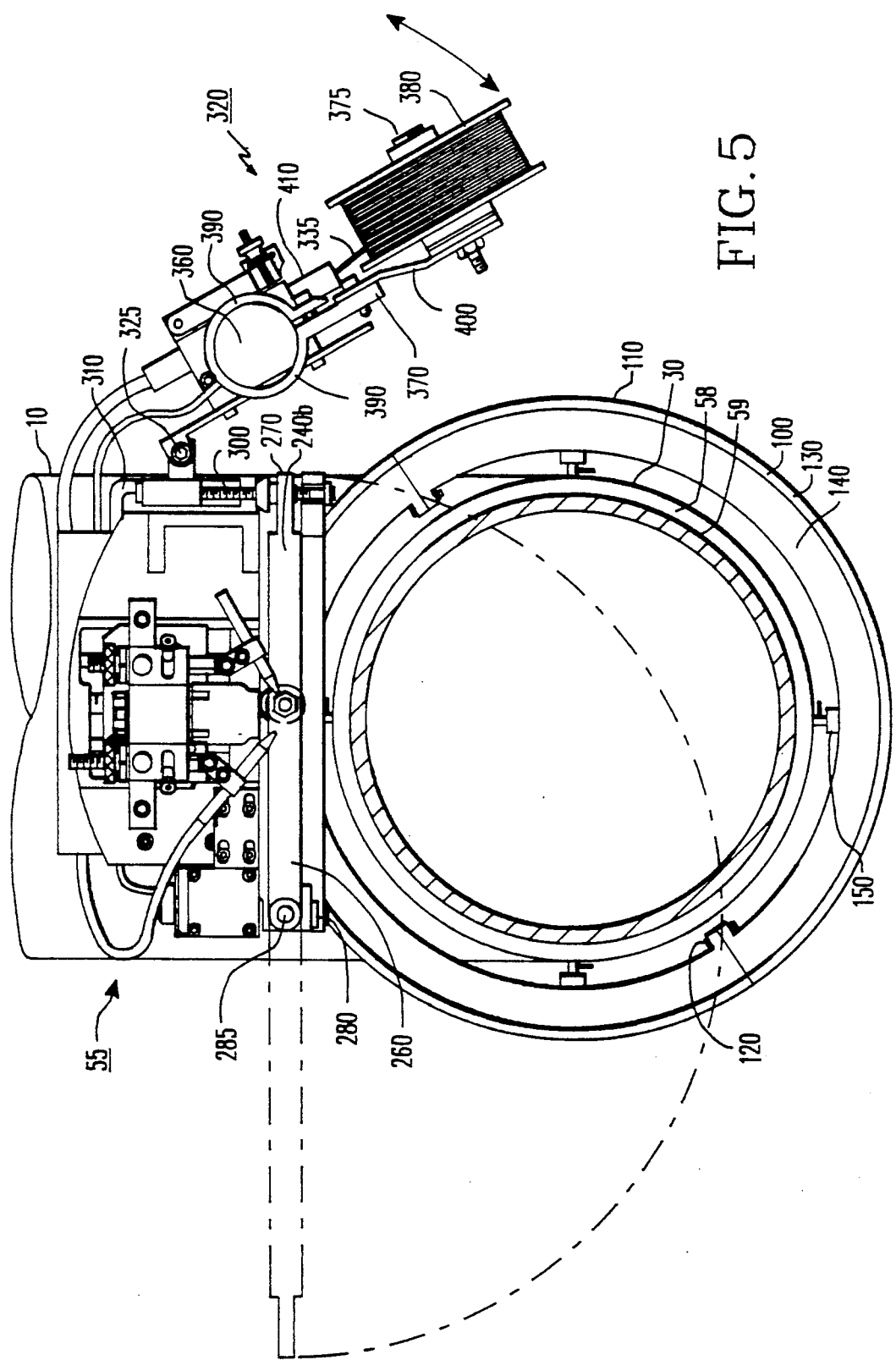
FIG. 5 shows the welding apparatus disposed on the track in operative condition for welding.

Referring to FIGS. 3, 4 and 5, circumscribing either pipe portion 30 or pipe portion 40 and removably affixed thereto is guide means, such as a circular track 100, for guiding welding apparatus 55 around either pipe portion 30 or pipe portion 40. By way of example, track 100 is shown circumscribing pipe portion 30 for guiding apparatus 55 around pipe portion 30. Alternatively, track 100 may circumscribe pipe portion 40 for guiding apparatus 55 around pipe portion 40. As described in more detail hereinbelow, apparatus 55 will ride track 100 around pipe portion 30 so that the seam defined by the interface of pipe end portions 50 and 60 is suitably welded. Track 100, which has a first bearing surface 110 thereon at the outermost circumference thereof for supporting apparatus 55, may comprise a plurality of sections, for example track sections 115a and 115b, connected by a plurality of fasteners 120 for removably placing track 100 around pipe portion 30. Track 100 has a T-shaped transverse cross section and thus has a flange 130 perpendicular to and integrally attached to a base 140. Flange 130 has a second bearing surface 142 and base 140 has a third bearing surface 144 for reasons recited hereinbelow. Moreover, track 100 includes a plurality of spaced-apart adjustable positioners 150 for precisely positioning and securing track 100 to pipe portion 30. It is important that positioners 150 precisely position track 100 around pipe portion 30. When positioners 150 precisely position track 100 around pipe portion 30, bearing surface 110 will be everywhere substantially equidistant from the outer surface of pipe portion 30 so that the distance between land 59 and apparatus 55 is maintained substantially constant for producing a quality weldment. Although an arc voltage control mechanism may maintain a suitable distance between electrode 57 and the joint, proper alignment of electrode 57 with respect to land 59 assists in providing uniform weld bead placement. Maintaining a substantially constant distance between land 59 and apparatus 55 will, for example, maintain the appropriate arc length so that risk of arc blow is minimized. Minimizing the risk of arc blow maximizes the possibility of achieving a quality weldment.

As best seen in FIGS. 4 and 5, each positioner 150 may comprise a hollow first cylinder having one end integrally attached to base 140 and having a second cylinder of smaller diameter slidably residing within the first cylinder. The second cylinder will be capable of slidably telescoping outwardly from the first cylinder and affixed into intimate engagement with pipe portion 30. In this regard, the first cylinder may have a hole formed through the wall thereof for receiving a setscrew which will be capable of intimately engaging the second cylinder for fixing the location of the second cylinder. Alternatively, the first cylinder may have internal threads therein for threadably engaging external threads, which may surround the second cylinder, so that the position of the second cylinder may be fixed at a predetermined location by turning the second cylinder. In either case, the second cylinder will be capable of advancing into engagement with pipe portion 30 or retracting to disengage the second cylinder from pipe portion 30. Thus, each positioner 150 will be capable of being adjusted and fixed for precisely positioning track 100 around pipe portion 30 so that the distance between apparatus 55 and land 59 will remain substantially constant for producing a quality weldment by maintaining suitable alignment of electrode 57 with the weld joint.

Figure 6:
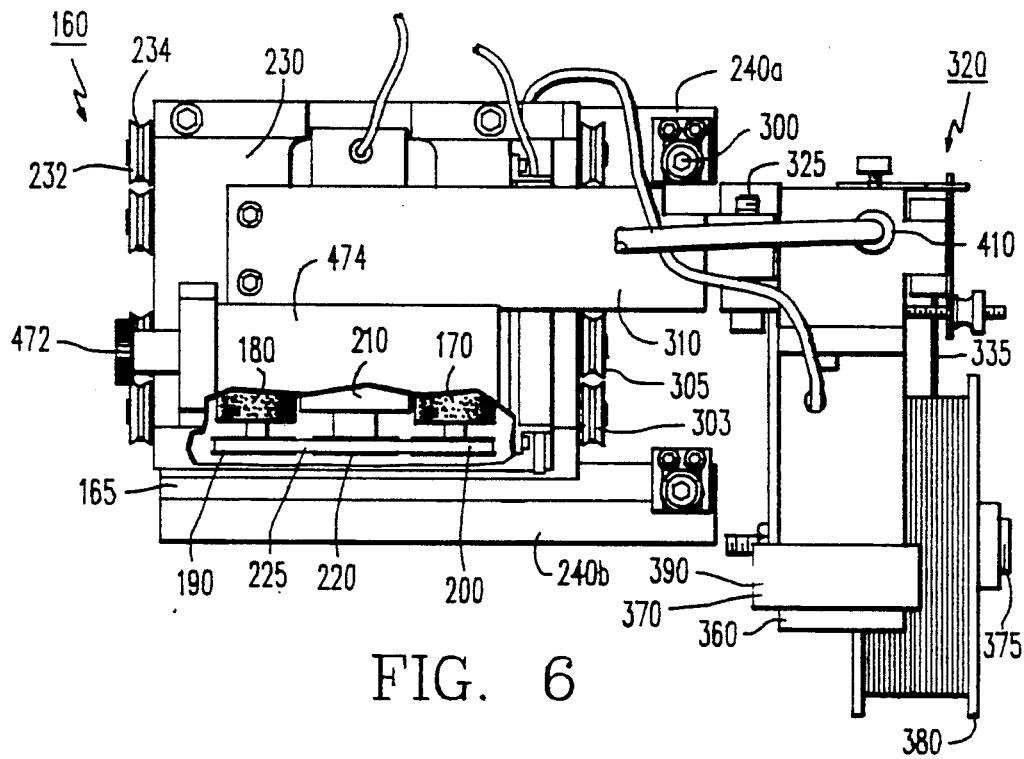
FIG. 6 is a plan view in partial horizontal section of a roller assembly belonging to the welding apparatus for rolling the welding apparatus around the track and showing a pulley system for rotating the rollers.
Figure 6A:
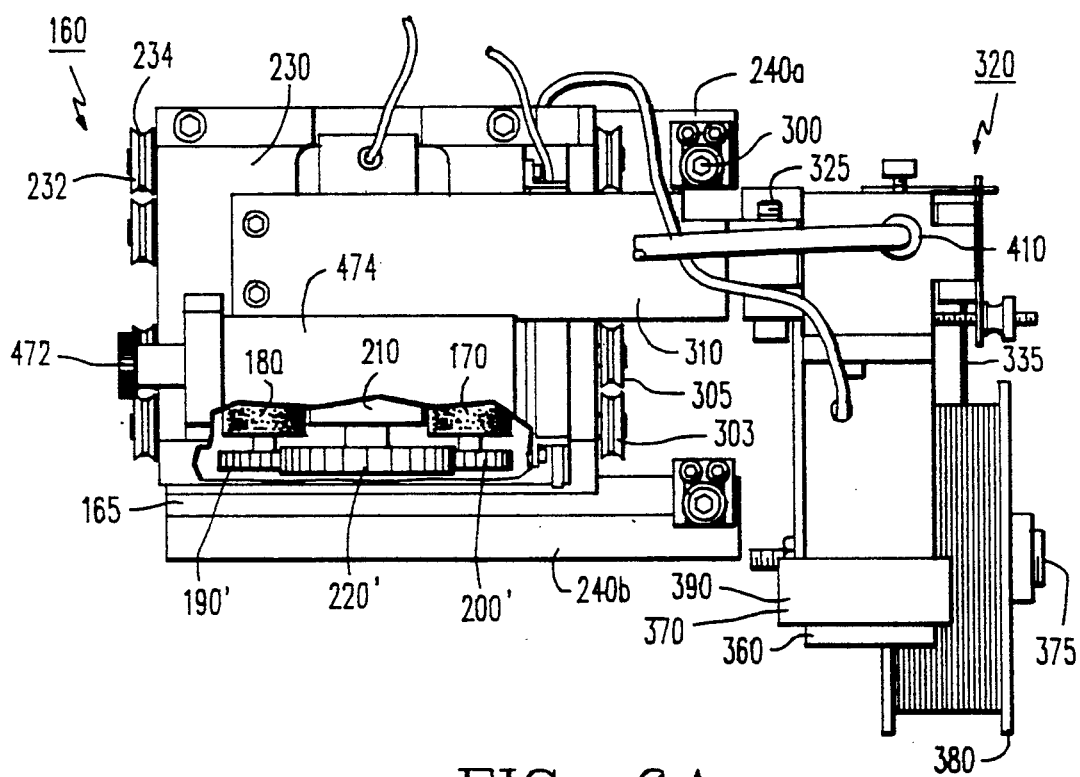
FIG. 6A is a plan view in partial horizontal section of a second embodiment of the roller assembly showing an interlocking gear system for rotating the rollers.

Referring to FIGS. 5, 6, 6A and 7 there is shown apparatus 55 in operative condition to weld a joint or seam defined by the interface of abutting pipe end portions 50 and 60. Apparatus 55 comprises roller means, such as a roller assembly generally referred to as 160, engaging track 100 for rolling apparatus 55 around track 100. Roller assembly 160 comprises a frame 165 having means, such as a rotatable first roller 170 and a rotatable second roller 180, connected thereto for rolling apparatus 55 on track 100. First roller 170 and second roller 180 may be generally cylindrical and preferably have a textured outer surface for grippingly engaging first bearing surface 110 of track 100 such that apparatus 55 will remain stationary on track 100 except when rollers 170 and 180 are rotated. Moreover, the textured outer surface of rollers 170 and 180 will grippingly engage first bearing surface 110 as rollers 170 and 180 are rotated. In this regard, the outside surfaces of first roller 170 and second roller 180 may have a multiplicity of raised nodules or protuberances thereon for grippingly engaging first bearing surface 110. Track 100 likewise may have a multiplicity of raised nodules or protuberances thereon for grippingly engaging the outside surfaces of rollers 170 and 180. In addition, connected to first roller 170 is a first pulley 190 for rotating first roller 170. Connected to second roller 180 is a second pulley 200 for rotating second roller 180. Interposed between first roller 170 and second roller 180 is a first motor 210 having a third pulley 220 connected thereto, which first motor 210 is capable of rotating third pulley 220. It will be appreciated that third pulley 220 may be off-set from the longitudinal center axes of first pulley 190 and second pulley 200 for tensioning a continuous pulley belt 225 which surrounds first pulley 190, second pulley 200, and third pulley 220. Pulley belt 225 simultaneously engages the marginal edges of first pulley 190, second pulley 200, and third pulley 220 for rotating first pulley 190 and second pulley 200 as third pulley 220 is rotated by first motor 210. First motor 210 may be a reversible, variable speed motor for rolling apparatus 55 at a predetermined or variable speed in either direction on track 100. As first motor 210 is operated, third pulley 220 which is connected thereto rotates. It will be understood that as third pulley 220 rotates, first pulley 190 and second pulley 200 also rotate in the same direction (i.e., either clockwise or counter clockwise) due to the engagement of pulley belt 225 with first pulley 190, second pulley 200 and third pulley 220. Rotation of first pulley 190 and second pulley 200 rotates first roller 170 and second roller 180, respectively, for rolling apparatus 55 on first bearing surface 110 which belongs to track 100. Moreover, covering the top of first roller 170, second roller 180, first pulley 190, second pulley 200, third pulley 220, and first motor 210 may be a cover 230 attached to a frame 165. Cover 230 protects first roller 170, second roller 180, and pulleys 190, 200, and 220 from dirt and scattered molten metal so that the outside surfaces of rollers 170 and 180 will remain substantially clean and so that pulleys 190, 200, and 220 and pulley belt 225 will not be fouled in a manner that interferes with the precise operation of roller assembly 160. In this manner, apparatus 55 will precisely travel track 100 without slip or creep. Alternatively, pulleys 190, 200, and 220 and pulley belt 225 may be replaced by interlocking rotatable first, second, and third gears 190', 200', and 220', respectively, for providing increased positive rotation of rollers 170 and 180 as illustrated in FIG. 6A.

As best seen in FIGS. 6 and 6A, connected to roller assembly 160 are a plurality of guide wheels 232. Each guide wheel 232 has a groove 234 circumscribing the marginal edge thereof for reasons described hereinbelow.

Figure 7:
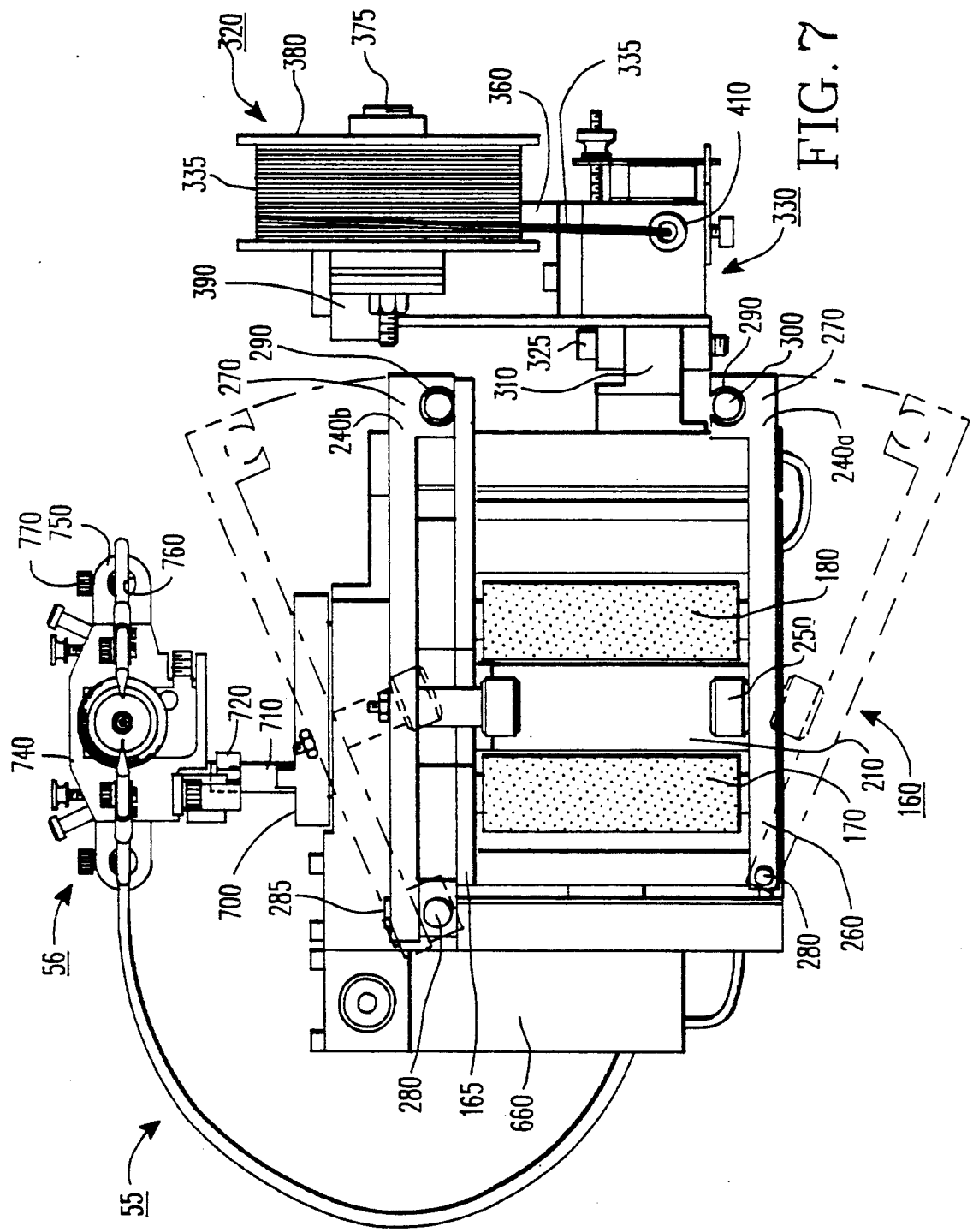
FIG. 7 is a view from beneath the welding apparatus showing the plurality of rollers and low-friction wheels.
Figure 8:
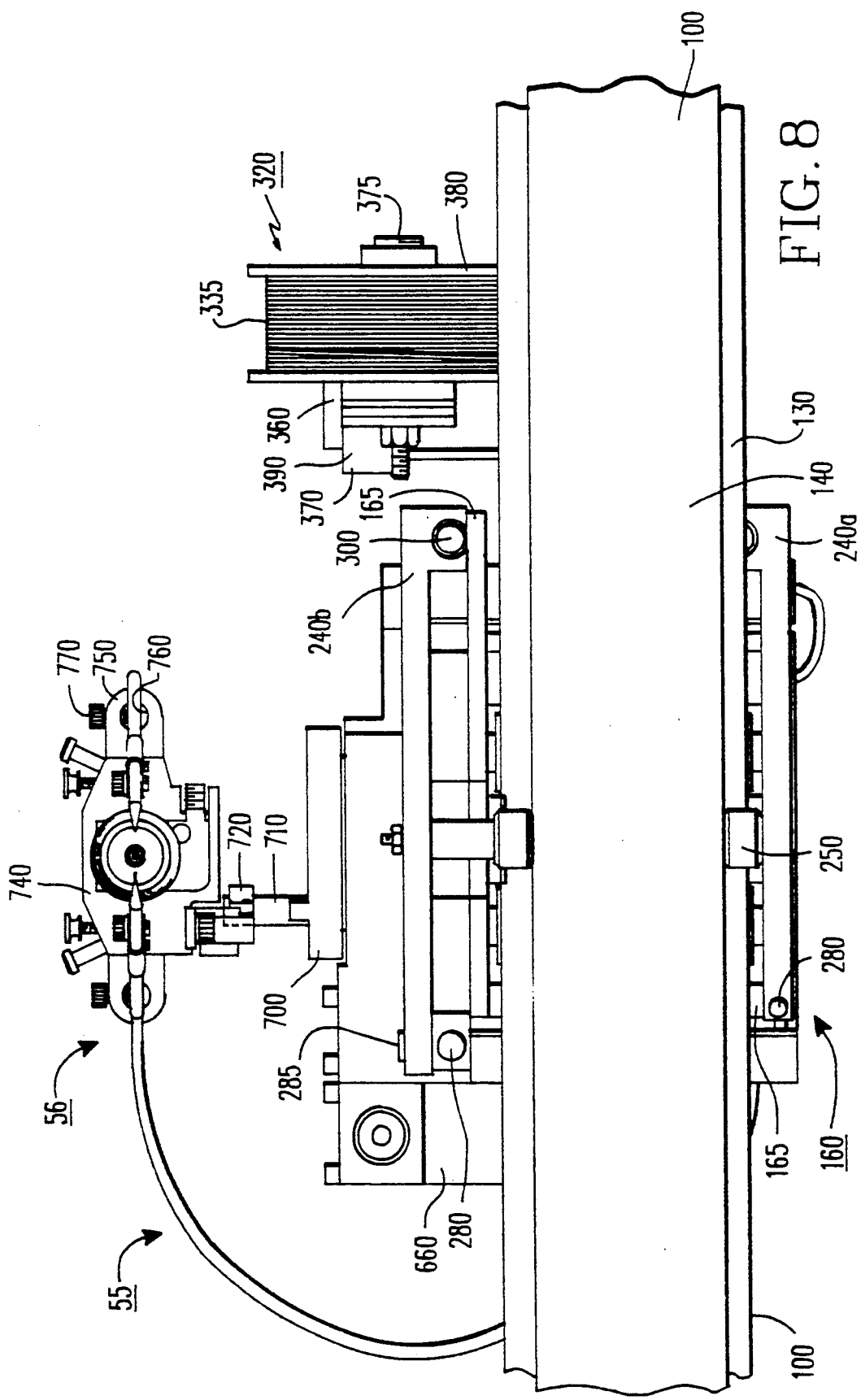
FIG. 8 is a view from beneath the welding apparatus showing the engagement of the welding apparatus with the track.

Referring to FIGS. 7 and 8, pivotally connected to frame 165 are at least two elongated clamp members 240a and 240b for clamping apparatus 55 to track 100. Clamps 240a and 240b each includes a generally cylindrical and freely rotatable low-friction cam follower or wheel 250 connected thereto, which wheel 250 is capable of contacting second bearing surface 142 and third bearing surface 144 belonging to track 100. Each wheel 250 abuts third bearing surface 144 belonging to track 100 for limiting the lateral movement of apparatus 55 with respect to base 140 so that apparatus 55 will precisely roll along track 100. It will be understood that each wheel 250 will rotate as first roller 170 and second roller 180 roll apparatus 55 around track 100 because each wheel 250 is freely rotatable and because each wheel 250 engages second bearing surface 142 and third bearing surface 144. As stated hereinabove, clamps 240a and 240b are capable of removably clamping apparatus 55 to track 100. In this regard, each clamp 240a and 240b has a first end 260 and a second end 270. Each first end 260 is pivotally connected to frame 165 by a first pivot pin 280 so that clamps 240a and 240b may pivot horizontally about first pivot pin 280 as shown in phantom in FIG. 7. In addition, each clamp 40a and 240b is pivotally connected to frame 165 by a second pivot pin 285 so that clamps 240a and 240b may pivot vertically about second pivot pin 285 as shown in phantom in FIG. 5. Moreover, as shown in FIG. 7, each second end 270 includes a hole 290 transversely therethrough to receive an attachment pin 300 for attaching clamps 240a and 240b s 55 is disposed on track 100, attaching clamps 240a and 240b to frame 165 also brings rollers 250 into abutment with second bearing surface 142 and third bearing surface 144. In this manner, apparatus 55 may be secured to track 100 by pivoting clamps 240a/240b inwardly towards track 100 and then attaching clamps 240a and 240b to frame 165 by using each attachment pin 300. Conversely, apparatus 55 may be unsecured or removed from track 100 by unattaching clamps 240a and 240b from attachment pins 300 and then pivoting clamps 240a and 240b outwardly from track 100.

Figure 9:
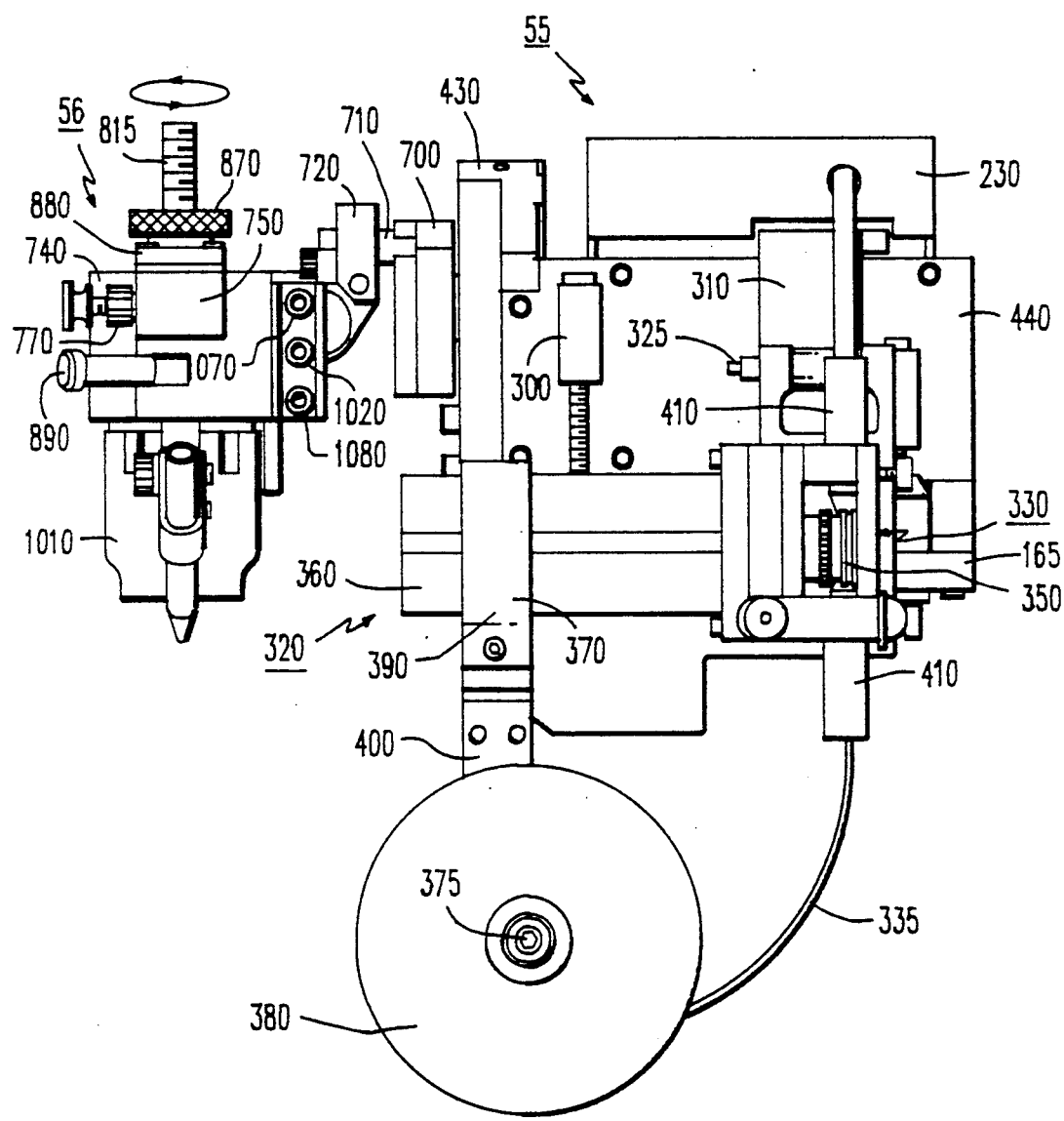
FIG. 9 is a side view of the welding apparatus.
Figure 11:
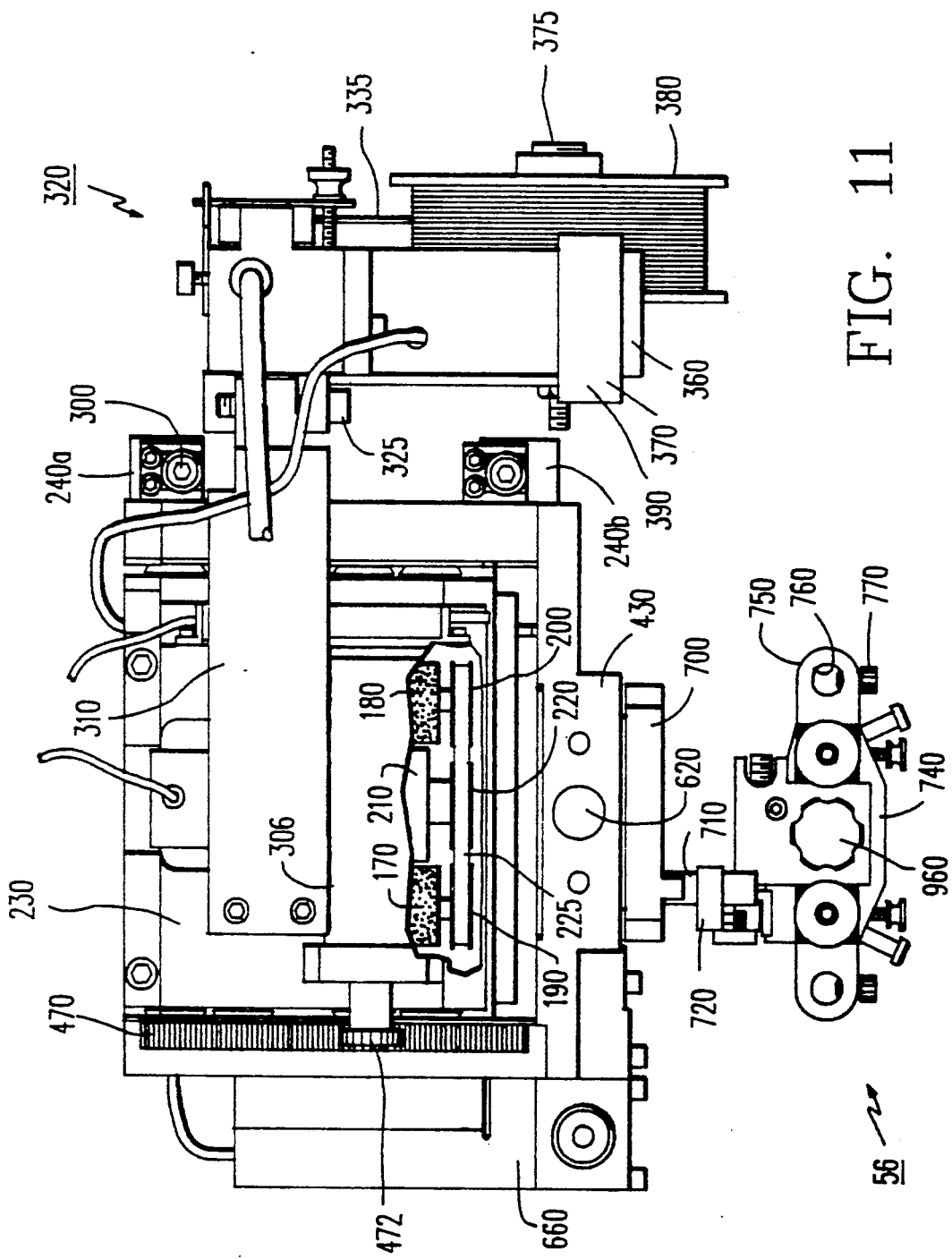
FIG. 11 is a plan view of the welding apparatus in partial horizontal section showing the carriage slidably mounted on the roller assembly.

Referring to FIGS. 5, 6 and 9, attached to cover 230 is an elongated first bracket 310 extending laterally outwardly from roller assembly 160 for supporting a filler wire spool assembly, generally referred to as 320.

Spool assembly 320 is pivotally connected to first bracket 310 by a bracket pin 325 so that spool assembly 320 can be pivotally adjusted in an arc having its center at bracket pin 325 as shown by the solid double-headed arrow in FIG. 5. Bracket pin 325 may also be tightened for locking spool assembly 320 in a desired radial position and untightened for adjustably moving spool assembly to a different radial position. Spool assembly 320 also comprises a wire feeder mechanism, generally referred to as 330, for feeding a filler wire 335 to the weld puddle or weld site (see FIG. 9). Feeder mechanism 330 includes a rotatable generally cylindrical ratchet 350 capable of engaging filler wire 335 for moving filler wire 335 by friction through feeder mechanism 330 and to the weld site. Connected to feeder mechanism 330 is a generally cylindrical second motor 360, which may be a reversible variable speed motor, for rotating ratchet 350 at a variable speed in either direction. Connected to second motor 360 is a pivotable second bracket 370 having a cylindrical axle 375 rotatably connected to second bracket 370 for rotatably supporting a spool 380 which is capable of receiving filler wire 335 therearound. By way of example only, second bracket 370 may comprise a circular band 390 slidably surrounding second motor 360, which circular band 390 may have an integral extension 400 connectable to axle 375. Thus, second bracket 370 may be pivoted in an arc about second motor 360 for adjustably radially positioning spool 380. Of course, it will be understood that spool 380 is capable of freely rotating on axle 375 as filler wire 335 is pulled from spool 388 by feeder mechanism 330.

Moreover, with particular reference to FIG. 9, two conduits 410 may be attached to feeder mechanism 330 for precisely aligning filler wire 335 against and into intimate engagement with rotatable ratchet 350. As ratchet 350 rotates and engages filler wire 335, the friction of ratchet 350 acting against filler wire 335 will cause filler wire 335 to experience a tension that will pull filler wire 335 from spool 380 and through conduits 410.

Figure 10:
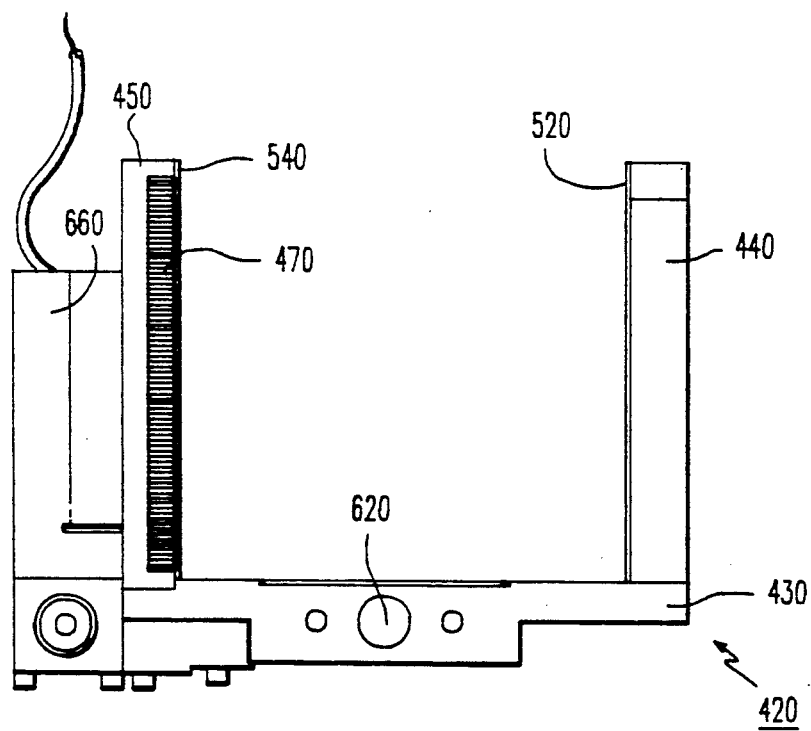
FIG. 10 is plan view of a carriage belonging to the welding apparatus.
Figure 12:
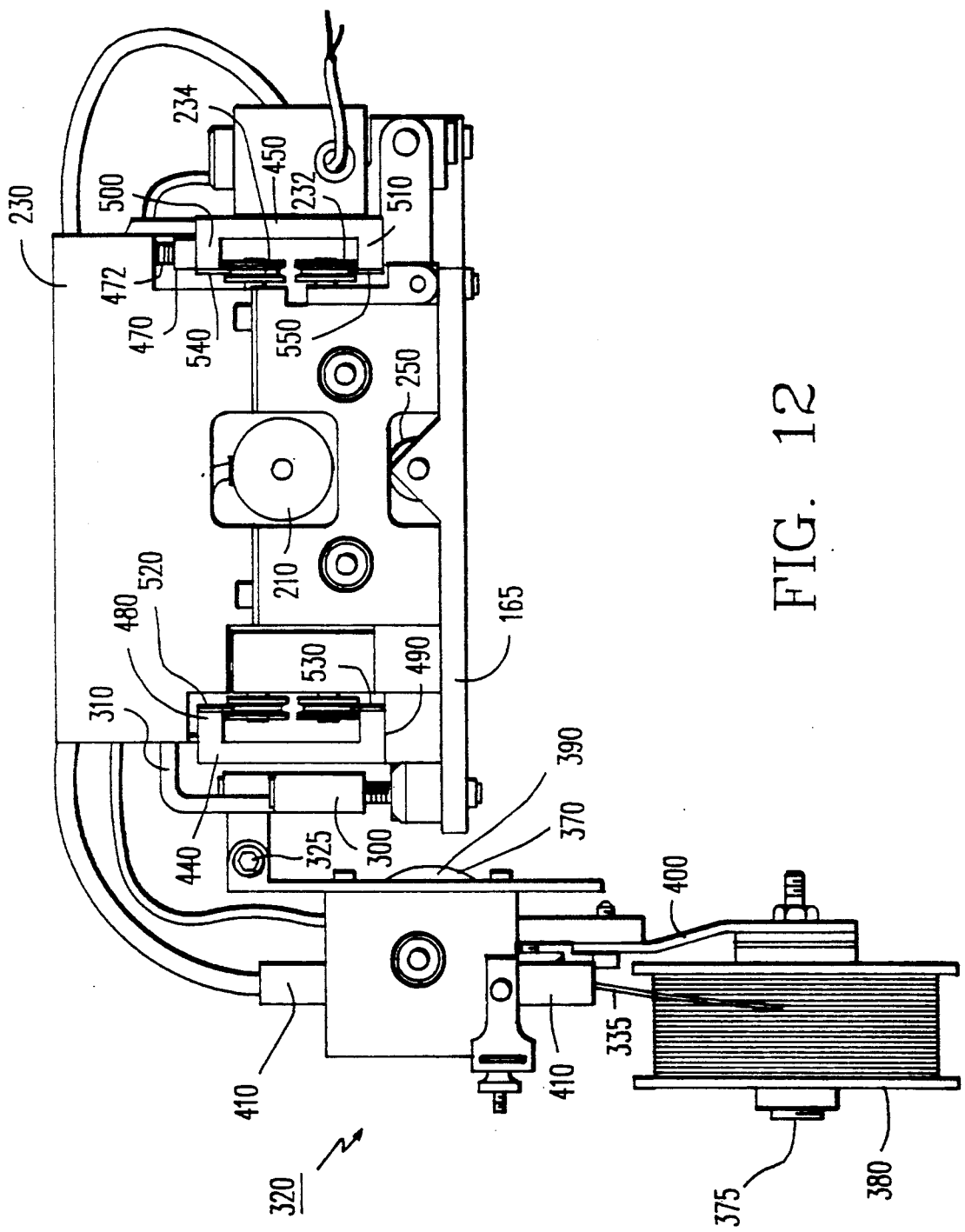
FIG. 12 shows the rear of the welding apparatus.

As best seen in FIGS. 6, 10 and 12, carrier means such as a carriage, generally referred to as 420, is slidably connected to roller assembly 160 and also connected to electrode housing 56 for carrying electrode housing 56 along an axis parallel to the longitudinal axis of pipe portion 30. Carriage 420 comprises a face plate 430 having an elongated first leg 440 and an elongated second leg 450 attached thereto and perpendicularly extending from face plate 430, wherein first leg 440 is parallel to second leg 450. Moreover, second leg 450 has an upper surface 460 thereon to which is attached an elongated gear rack 470 extending therealong capable of engaging a pinion gear 472 which extends from a variable speed reversible third motor 474 mounted on cover 230. Pinion gear 472 is capable of being rotated by third motor 474. Moreover, integrally formed with first leg 440 are a first flange 480 and a second flange 490. Integrally formed with second leg 450 are a third flange 500 and a fourth flange 510. Attached to first flange 480 is a depending elongated first rail 520 (i.e., a first upper rail) for matingly slidably engaging groove 234 formed in each associated guide wheel 232. Similarly, attached to second flange 490 is an elongated second rail 530 (i.e., a first lower rail) for matingly slidably engaging groove 234 formed in the associated guide wheel 232. Moreover, attached to third flange 500 is a depending elongated third rail 540 (i.e., a second upper rail) for matingly slidably engaging groove 234 in the associated guide wheel 232. Similarly, attached to fourth flange 510 is an elongated fourth rail 550 (i.e., a second lower rail) for matingly slidably engaging groove 234 in the associated guide wheel 232. Thus, carriage 420 to roller assembly 160 by the sliding engagement of rails 520, 530, 540, and 550 with groove 234 formed in each associated wheel 232. Therefore, carriage 420 is capable of being advanced slidably outwardly from roller assembly 160 for extending or carrying electrode housing 56 along an axis parallel to the longitudinal center axis of pipe portion 30. Conversely, carriage 420 is capable of being retracted slidably inwardly toward roller assembly 160. Moreover, rails 520, 530, 540, and 550 may be relatively long, such as up to approximately four feet, for enabling carriage 420 and thus electrode housing 56 to be oscillated up to approximately four feet in either direction parallel to the longitudinal axis of pipe portions 30 and 40. Such relatively long rails obviate the need to continually reposition track 100 on pipe portion 30.

Figure 13:
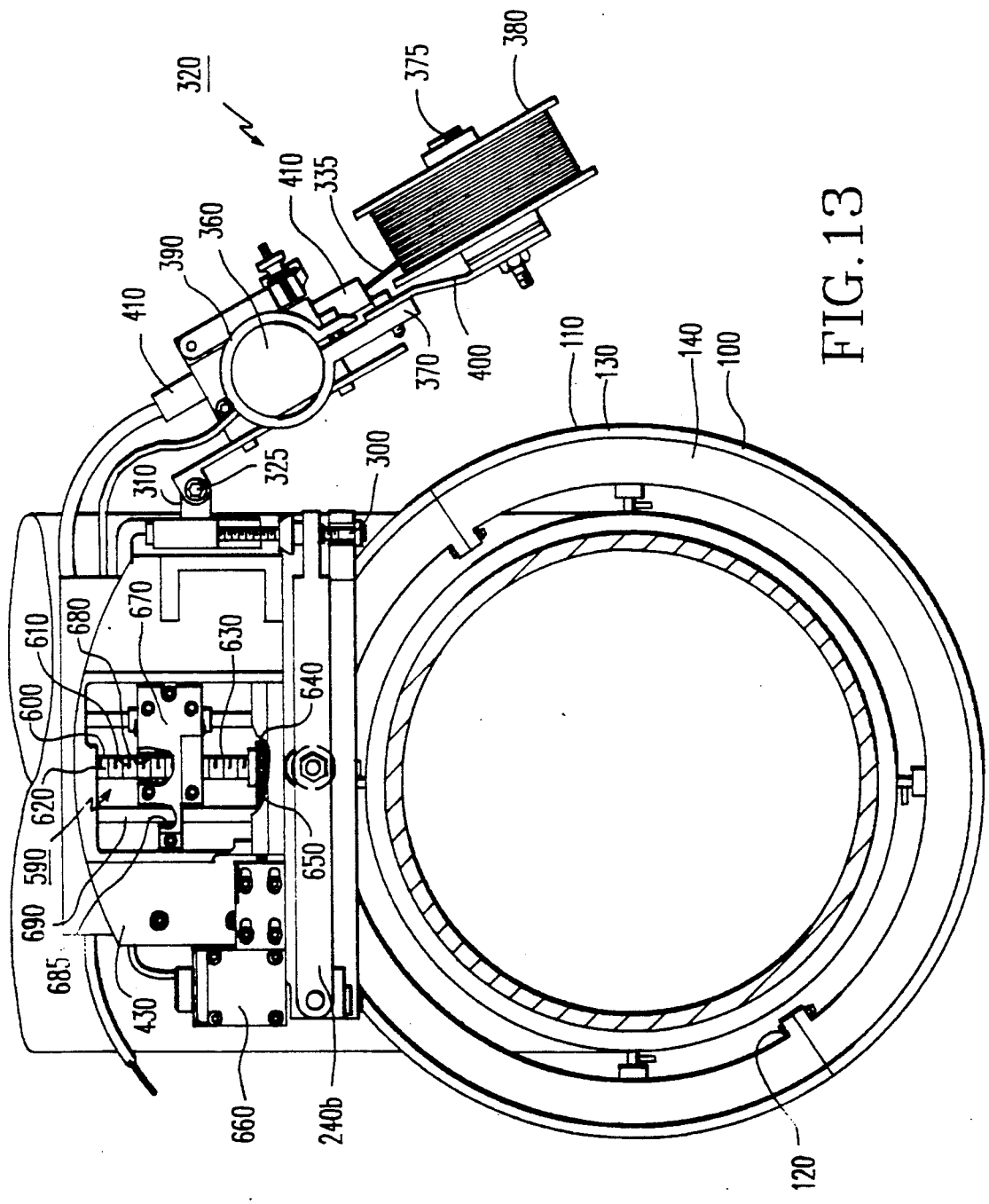
FIG. 13 shows in partial vertical section, an elevator platform connected to the welding apparatus.
Figure 14:
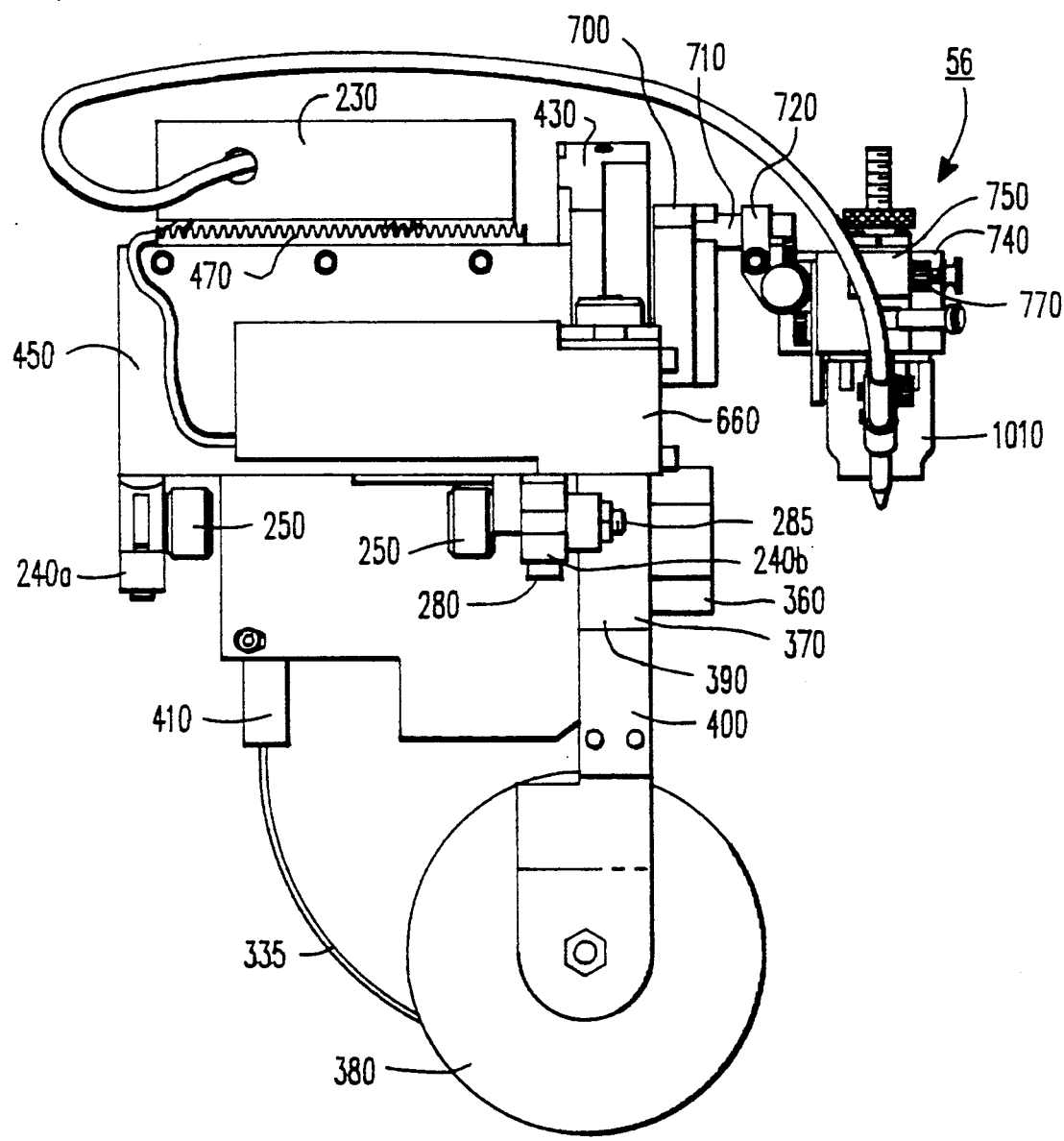
FIG. 14 illustrates another side of the welding apparatus.

Referring to FIGS. 13 and 14, biasing means such as a lead screw assembly, generally referred to as 590, is connected to face plate 430 of carriage 420 and is also connected to electrode housing 56 for biasing electrode housing 56 along an axis substantially perpendicular to the longitudinal center axis of pipe portion 30. Lead screw assembly 590 comprises a cylindrical lead screw 600 having external threads 610 therearound. Lead screw 600 has a lead screw first end portion 620 rotatably connected to face plate 430 and a lead screw second end portion 630 also rotatably connected to face plate 430. Attached to and surrounding lead screw second end portion 630 is a sprocket wheel 640 for engaging a continuous chain 650. Chain 650 in turn rotatably engages a fourth motor 660 which is attached to second leg 450 of carriage 420. Fourth motor 660, which may be a reversible variable speed motor, is capable of rotating chain 650 for rotating sprocket wheel 640 so that lead screw 600 rotates on its longitudinal axis. Threadably mounted on lead screw 600 is an elevator platform 670 having a threaded bore 680 therethrough for threadably engaging the external threads 610 of lead screw 600. Elevator platform 670 also has a plurality of smooth bores 685 therethrough parallel to threaded bore 680 for reasons to be described presently. It will be appreciated that as fourth motor 660 rotates chain 650, sprocket wheel 640 will also rotate for rotating lead screw 600. It will be further appreciated that as lead screw 600 rotates, elevator platform 670 will be biased along the longitudinal center axis of lead screw 600 due to the threaded engagement of threaded bore 680 and lead screw 600. Lead screw assembly 590 further includes a plurality of space-apart elongated smooth parallel bars 690. Each bar 690 extends through its associated bore 685 for limiting rotation of elevator platform 670 about the longitudinal axis of lead screw 600. Each end of each bar 690, which smooth bars 690 are matingly disposed through smooth bores 685 parallel to the longitudinal axis of lead screw 600, is attached to face plate 430. As stated hereinabove, each bar 690, which is slidably received through its associated smooth bore 685, limits the rotational movement of elevator platform 670 so that elevator platform 670 will be precisely translated along lead screw 600 without rotating about the longitudinal axis of lead screw 600. Moreover, elevator platform 670 also includes an attachment plate 700 attached thereto such that attachment plate 700 is simultaneously biased in the same direction as elevator platform 670. Extending outwardly from attachment plate 700 and attached thereto is a generally cylindrical male connector 710 for reasons described hereinbelow. Moreover, it should be appreciated that the arc voltage control mechanism referred to hereinabove may comprise face plate 430, lead screw assembly 590, fourth motor 660, platform 670 and bars 690.

Figure 15:
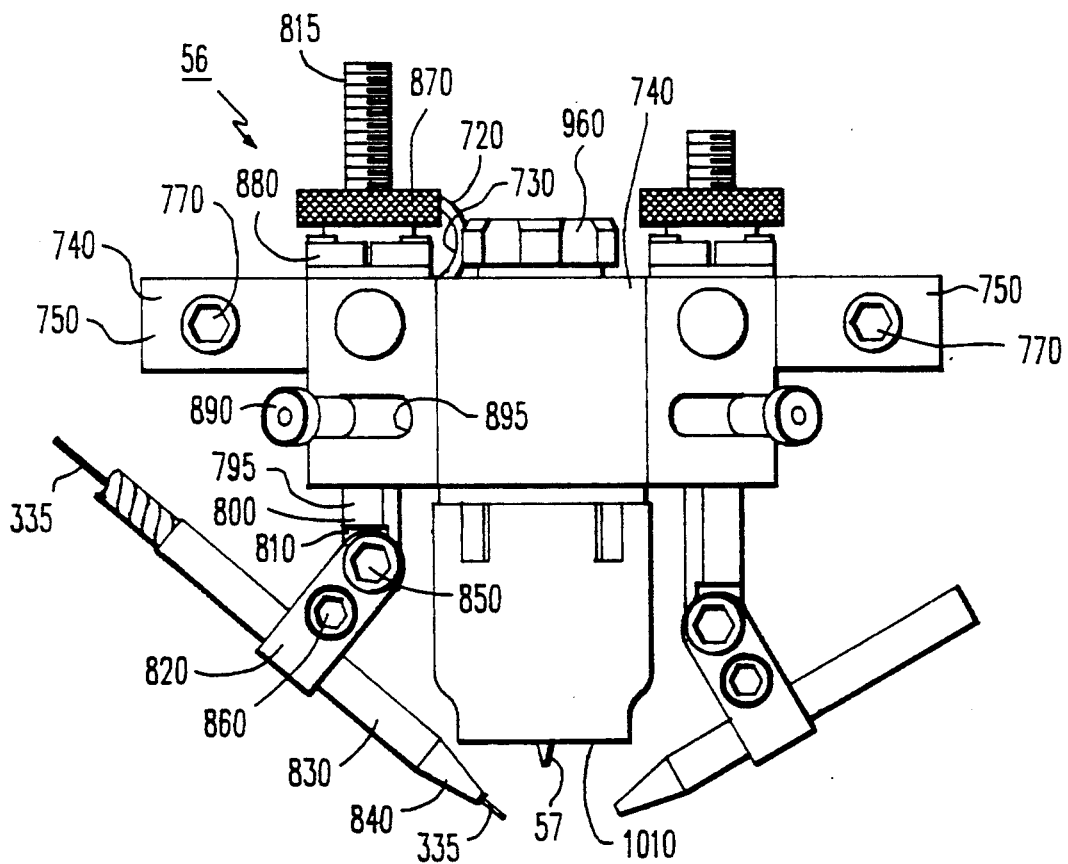
FIG. 15 shows an electrode housing for housing an electrode.

As best seen in FIGS. 7, 14, and 15, electrode housing 56 is connected to attachment plate 700 such that electrode housing 56 is simultaneously biased in the same direction as attachment plate 700 when elevator platform 670, to which attachment plate 700 is attached, is biased by fourth motor 660. As stated hereinabove, extending outwardly from attachment plate 700 is male connector 710 for matingly engaging a female connector 720 belonging to electrode housing 56. In this regard, female connector 720 has a generally cylindrical hole 730 therethrough for matingly slidably receiving male connector 710. As described in more detail hereinbelow, electrode housing 56 further comprises an electrode and filler wire manipulator assembly or torch block member 740 connected to female connector 720. Welding block member 740 may be aluminum for resisting corrosion and for reducing the weight of housing 56.

Figure 16:
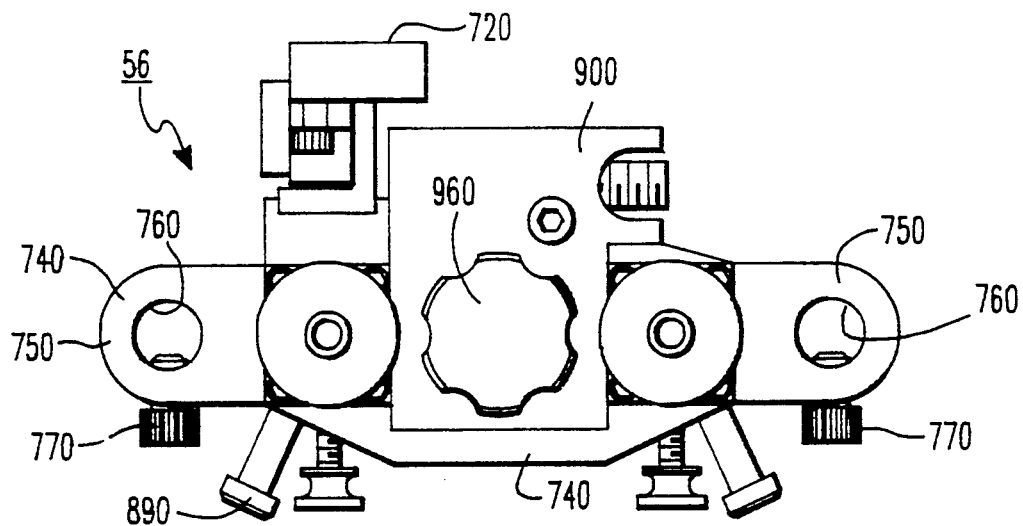
FIG. 16 is a plan view of the electrode housing.

With particular reference to FIGS. 15 and 16, welding block member 740 may include at least one wing 750 integrally connected thereto and laterally outwardly extending therefrom for the attachment of a watercooled video camera (not shown) so that the welding operation may be remotely visually monitored. Wing 750 may have an aperture 760 transversely therethrough for receiving mounting posts (not shown) belonging to the camera. Threadably extending through wing 750 and into aperture 760 may be a set-screw or screw fastener 770 for locking the position of the mounting posts.

Figure 17:
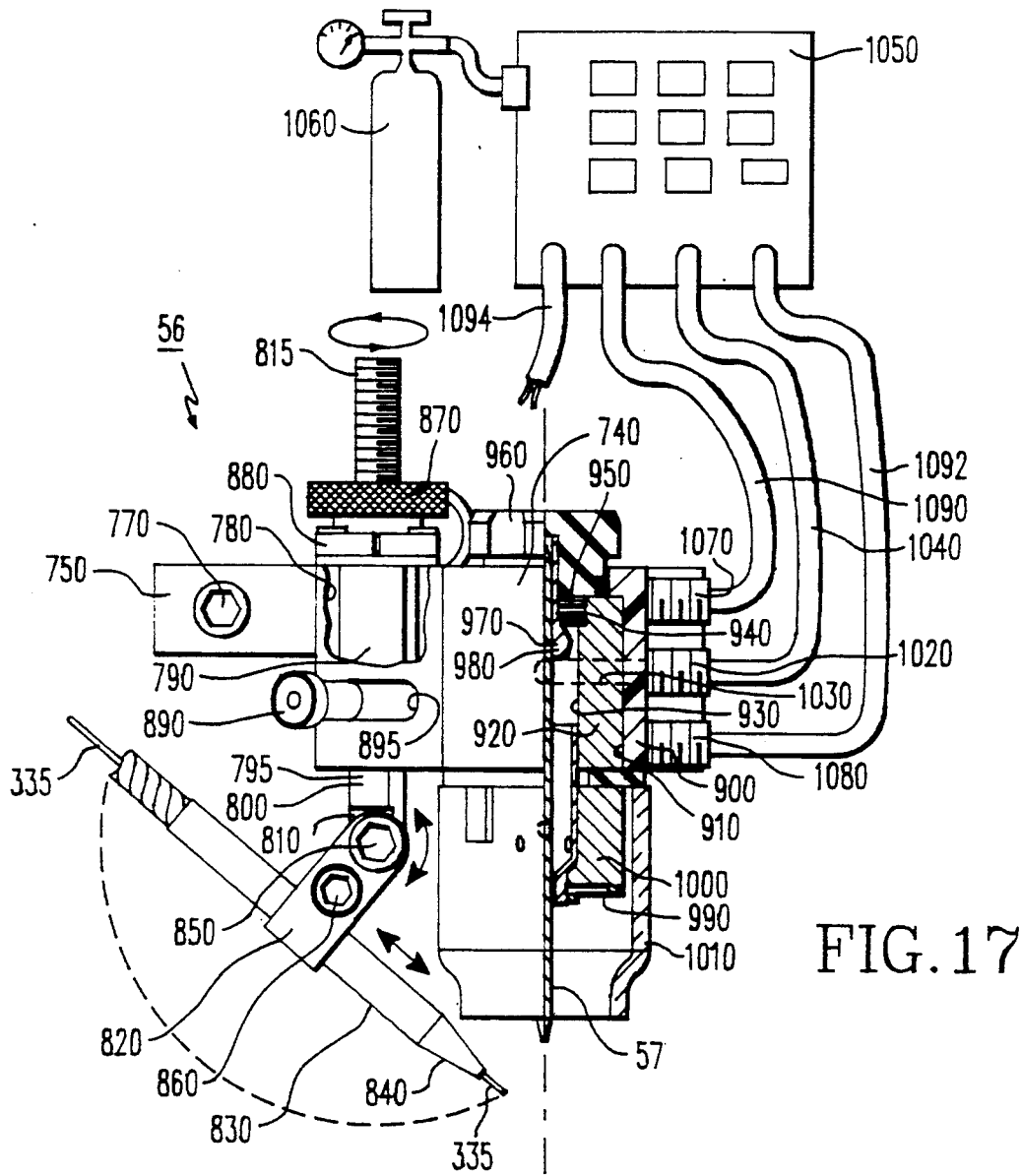
FIG. 17 illustrates the electrode housing in partial vertical section and connected to a power supply source.
Figure 18:
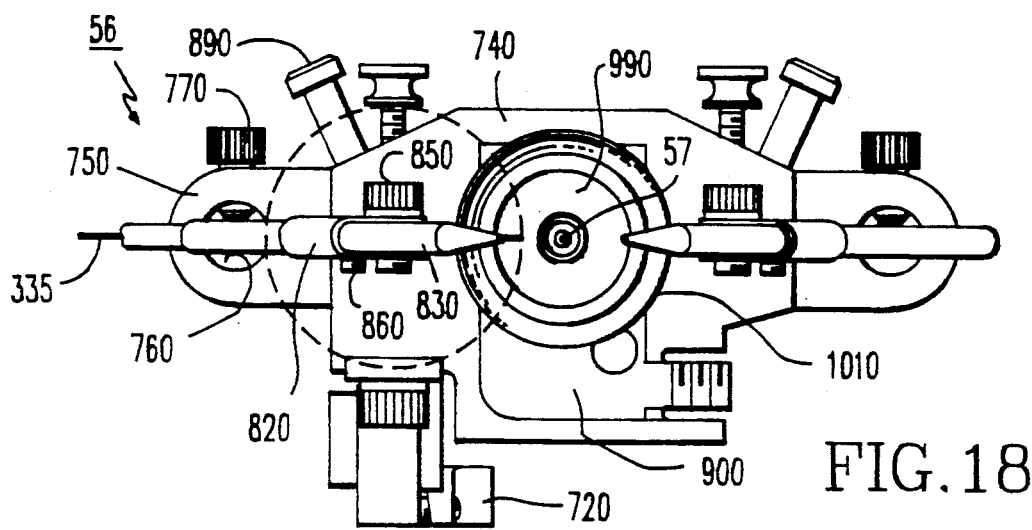
FIG. 18 is a view from beneath the electrode housing.
Figure 19:
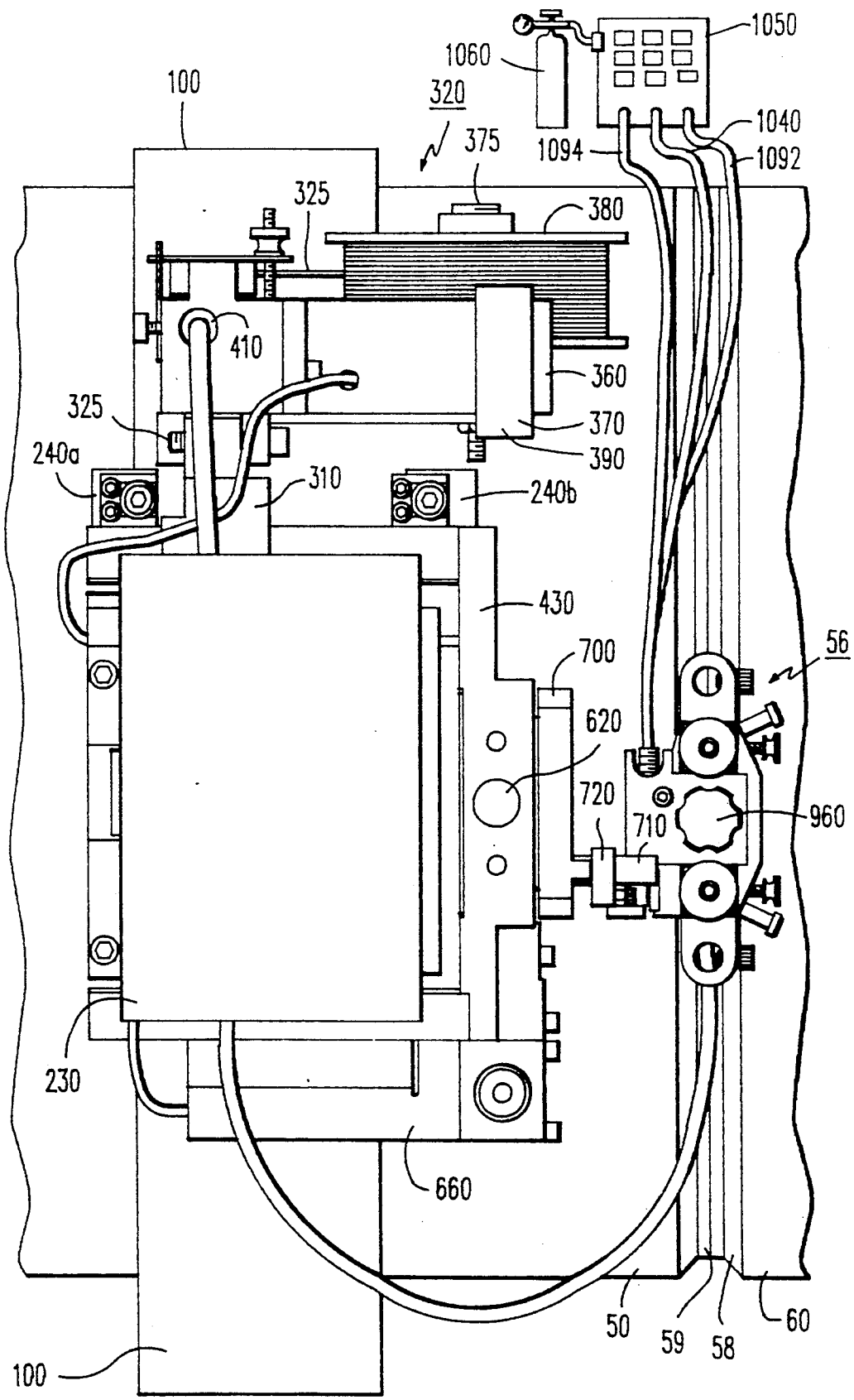
FIG. 19 illustrates the welding apparatus operatively disposed on the track and connected to the power supply source.

Referring to FIGS. 17, 18, and 19 extending transversely through block member 740 is at least one generally cylindrical smooth bore 780 for matingly slidably receiving a generally cylindrical sleeve 790 capable of being disposed in bore 780. Sleeve 790 has a polygonal-shaped hole (not shown) formed therethrough, which hole extends the length of sleeve 790. Extending through the hole is a manipulator arm 795 for precisely manipulating filler wire 335 in an arc as shown by the dashed line in FIG. 18 and also for manipulating filler wire 335 in a direction substantially perpendicular to the longitudinal center axis of pipe portion 30. In this regard, manipulator arm 795 comprises an elongated shaft 800 matingly slidably received through the hole in sleeve 790, the shaft 800 having a polygonal transverse cross section of the same shape as the polygonal-shaped hole through sleeve 790. It will be understood that as sleeve 790 is slidably turned or rotated in bore 780, shaft 800 will also simultaneously turn or rotate to a like extent due to the mating engagement of polygonal-shaped shaft 800 in the polygonal-shaped hole formed through sleeve 790. Shaft 800 also has a first end portion 810 and an externally threaded second end portion 815. First end portion 810 is connected to a tube holder 820 for holding a tube 830 capable of receiving filler wire 335 therethrough. Tube 830 includes a frusto-conical end portion 840 for precisely guiding filler wire 335 through end portion 840 so that filler wire 335 is precisely directed to the weld puddle or weld site. Holder 820 is pivotally attached to end portion 810 by holder pin 850 such that holder 820 and thus tube 830 are capable of pivoting about holder pin 850 in a direction that is substantially along the dashed line shown in FIG. 17. Tube 830 is removably secured in holder 820 such as by a tightener screw 860 for clamping tube 830 in holder 820. Alternatively, tube 830 may be secured in holder 820 by press fit. Second end portion 815 extends outwardly from block member 740 for threadably receiving an internally threaded nut 870 thereon, which nut 870 is rotatably anchored to block member 740 by an anchor block 880 attached to block member 840. That is, nut 870 is capable of rotating although anchored to block member 740. Thus, shaft 800 will be precisely biased in sleeve 790 along the longitudinal axis of shaft 800 as nut 870 is rotated because nut 870 threadably engages second end portion 815 and because nut 870 is rotatably anchored to block member 740. Moreover, integrally attached to sleeve 790 is an elongated handle 890 outwardly extending therefrom through a slot 895 formed through block member 740 for turning or rotating sleeve 790 so that tube 830 may be pivoted along the dashed line shown in FIG. 18.

Referring to FIGS. 17 and 18, it will be appreciated that there are at least four degrees of freedom associated with filler wire 335 for precisely manipulating filler wire 335 at the weld site. A first degree of freedom for filler wire 335 occurs about the longitudinal axis of shaft 800 as handle 890 is rotated (see FIG. 18). A second degree of freedom occurs about holder pin 850 as tube 830 is pivoted about holder pin 850 (see FIG. 17). A third degree of freedom occurs along the longitudinal axis of tube 830 by advancing or retracting filler wire 335 through tube 830. A fourth degree of freedom occurs along the longitudinal center axis of shaft 800 as shaft 800 is raised or lowered by rotating nut 870. By way of example only, nut 870 coacting with shaft 800 may provide approximately 1.5 inches of vertical adjustment. Holder pin 850 may provide approximately 150 degrees of pivoting adjustment. Handle 890 coacting with sleeve 790 may provide approximately 360 degrees of adjustment and filler wire 335 may be telescoped through tube holder 830 to provide up to approximately five inches of adjustment. These four degrees of freedom allow filler wire 335 to be precisely manipulated at the weld site for adjusting the filler wire entry angle to obtain a quality weldment.

Referring to FIGS. 5, 13, 14 and 15, it will be further appreciated that there are at least five degrees of freedom associated with electrode housing 56 and thus associated with electrode 57. A first degree of freedom occurs along a path circumscribing pipe portion 30 as apparatus 55 rolls on track 100. A second degree of freedom occurs along a axis parallel to the longitudinal center axis of pipe portion 30 because carriage 420 is capable of advancing or retracting on roller assembly 160 along an axis parallel to the longitudinal center axis of pipe portion 30. That is, advancement or retraction of carriage 420 results in moving electrode housing 56 and electrode 57 along an axis parallel to pipe portion 30. A third degree of freedom occurs along an axis perpendicular to pipe portion 30 because elevator platform 670 is capable of being raised or lowered in the manner described hereinabove. Raising or lowering elevator platform 670 results in moving electrode housing 56 and electrode 57 along the axis perpendicular to pipe portion 30. A fourth degree of freedom is centered about the point where female connector 720 receives male connector 710 (see FIGS. 14 and 15). A fifth degree of freedom occurs about a swivel pin 875 connecting electrode housing 56 to female connector 720. That is, electrode housing 56 and electrode 57 are capable of pivoting about swivel pin 875 for providing the fifth degree of freedom. These five degrees of freedom allow electrode housing 56 and thus electrode 57 to be precisely positioned at the weld site for obtaining a quality weldment.

As best seen in FIGS. 17 and 18, block member 740 also includes an electrically non-conducting insert 900, which may be a phenolic material capable of with standing high temperatures which may approximate 6500 degrees Fahrenheit. Insert 900 has a bore 910 therethrough. Disposed in bore 910 is a hollow cylindrical metal member 920 having a step-wise central bore 930 therethrough having an internally threaded female portion 940 of smaller diameter for matingly threadably receiving an externally threaded male extension 950 belonging to a cap 960. Cap 960 may be an electrically non-conducting heat resistent material such as a phenolic material. Extending from cap 960 into central bore 930 is a vice 970 having a plurality of fingers 980 for securely grasping electrode 57, which may be a non-consumable electrode made of 98% tungsten and 2% thorium.

Again referring to FIGS. 17, 18, and 19 a circular fine mesh metal screen 990 (i.e., a gas lens) is disposed in central bore 930 and is connected to member 920 for laminating the shielding gas (not shown) flowing around electrode 57. Screen 990 is perpendicular to electrode 57 and has an opening therethrough for passage of electrode 57. Also disposed in central bore 930 and attached to member 920 is a tubular electricity conducting electrical contact 1000 surrounding electrode 57 and in contact therewith for conducting electrical current thereto. Moreover, attached to housing 56 and surrounding electrode 57 and screen 990 is a gas cup 1010 for confining the shielding gas so that the shielding gas surrounds electrode 57 and the weld puddle (not shown). Attached to the outside surface of insert 900 is a first nozzle 1020. Extending from first nozzle 1020 to central bore 930 is a first channel 1030 for conducting the shielding gas from nozzle 1020 to central bore 930. Connected to first nozzle 1020 is a flexible first conduit 1040 for conducting shielding gas therethrough from a power supply 1050. It will be understood that connected to power supply 1050 is a shielding gas reservoir 1060 for supplying the shielding gas to power supply 1050 and thence to conduit 1040. Also attached to the outside surface of insert 900 is a second nozzle 1070 and a third nozzle 1080 for reasons to be described presently. Connected to second nozzle 1070 is a flexible second conduit 1090 and connected to third nozzle 1080 is a flexible third conduit 1092. Extending through insert 900 from second nozzle 1070 to third nozzle 1080 is an annular second channel (not shown) for conducting coolant, such as water, to cool insert 900 so that the heat, which may approximate 6500 degrees Fahrenheit, generated in insert 900 due to the elevated temperature of electrode 57 will not melt insert 900. Thus, it will be appreciated that the second channel extends around central bore 930 for cooling insert 900. Moreover, electrically connected to electrical contact 1000 and to power supply 1050 is a flexible fourth conduit 1094 having electrically conducting wires therethrough for supplying electrical current to contact 1000 and thus to electrode 57. A plurality of other electrical conduits (not shown) may extend from power supply 1050 to first, second, third, and fourth motors 210, 360, 474, and 660, respectively, for operating these motors. Power supply 1050 also may be capable of producing oscillating motion of carriage 420 and thus electrode 57. It will be appreciated that the configuration of the first embodiment of the invention obtains a minimal axial configuration when the available space for welding in the direction parallel to the longitudinal center axis of pipe portions 30 and 40 is limited.

Second Embodiment of the Invention

Figure 20:
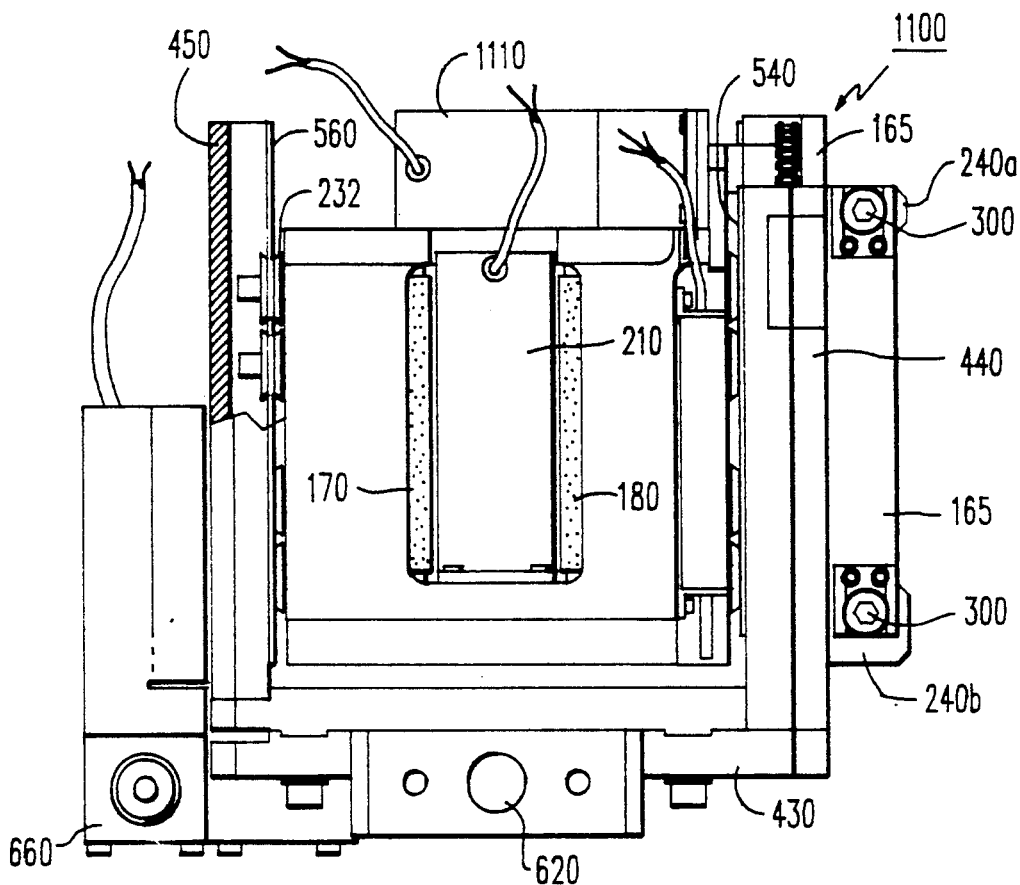
FIG. 20 is a view in partial horizontal section of a second embodiment of the invention with parts removed for clarity, wherein the carriage is mounted on the roller assembly.
Figure 21:
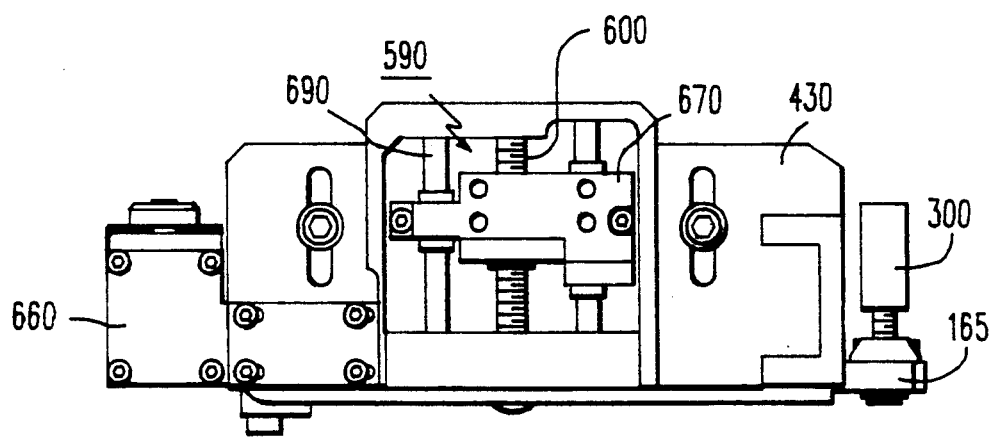
FIG. 21 is a view of the second embodiment of the invention with parts removed for clarity.
Figure 22:
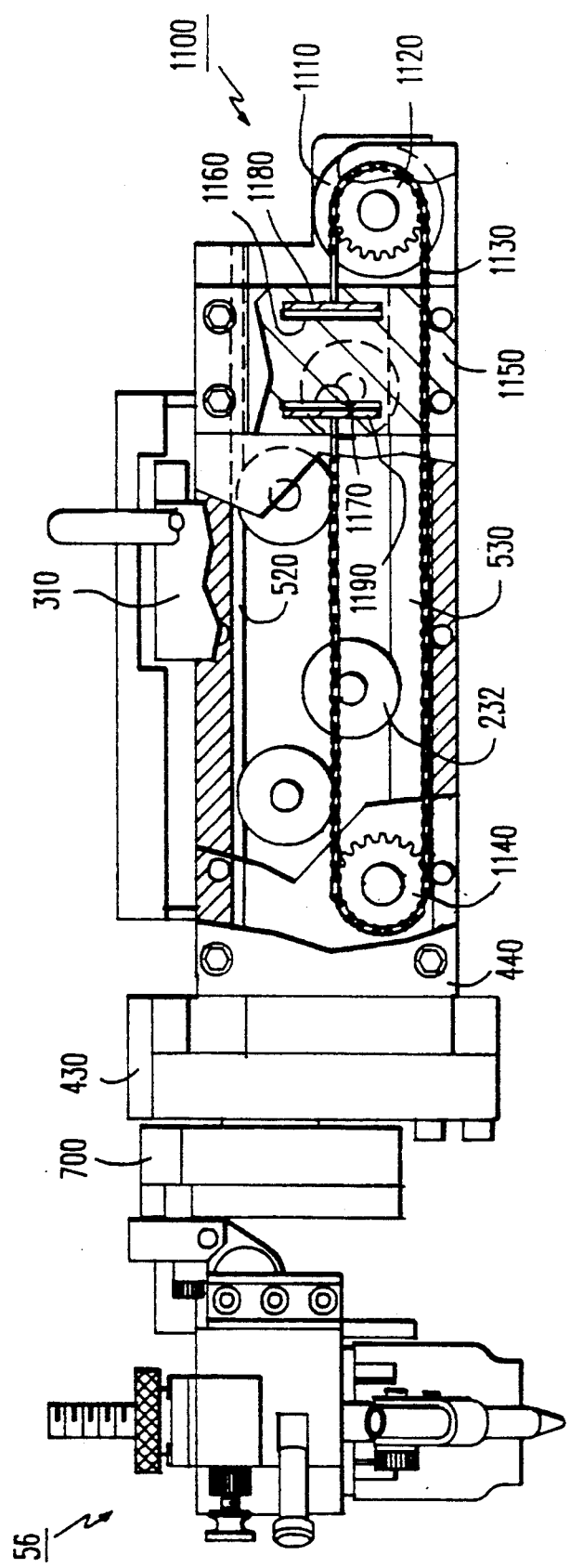
FIG. 22 is a view of the second embodiment of the invention in partial vertical section illustrating a carriage biasing assembly having a link chain for biasing the carriage.
Figure 23:
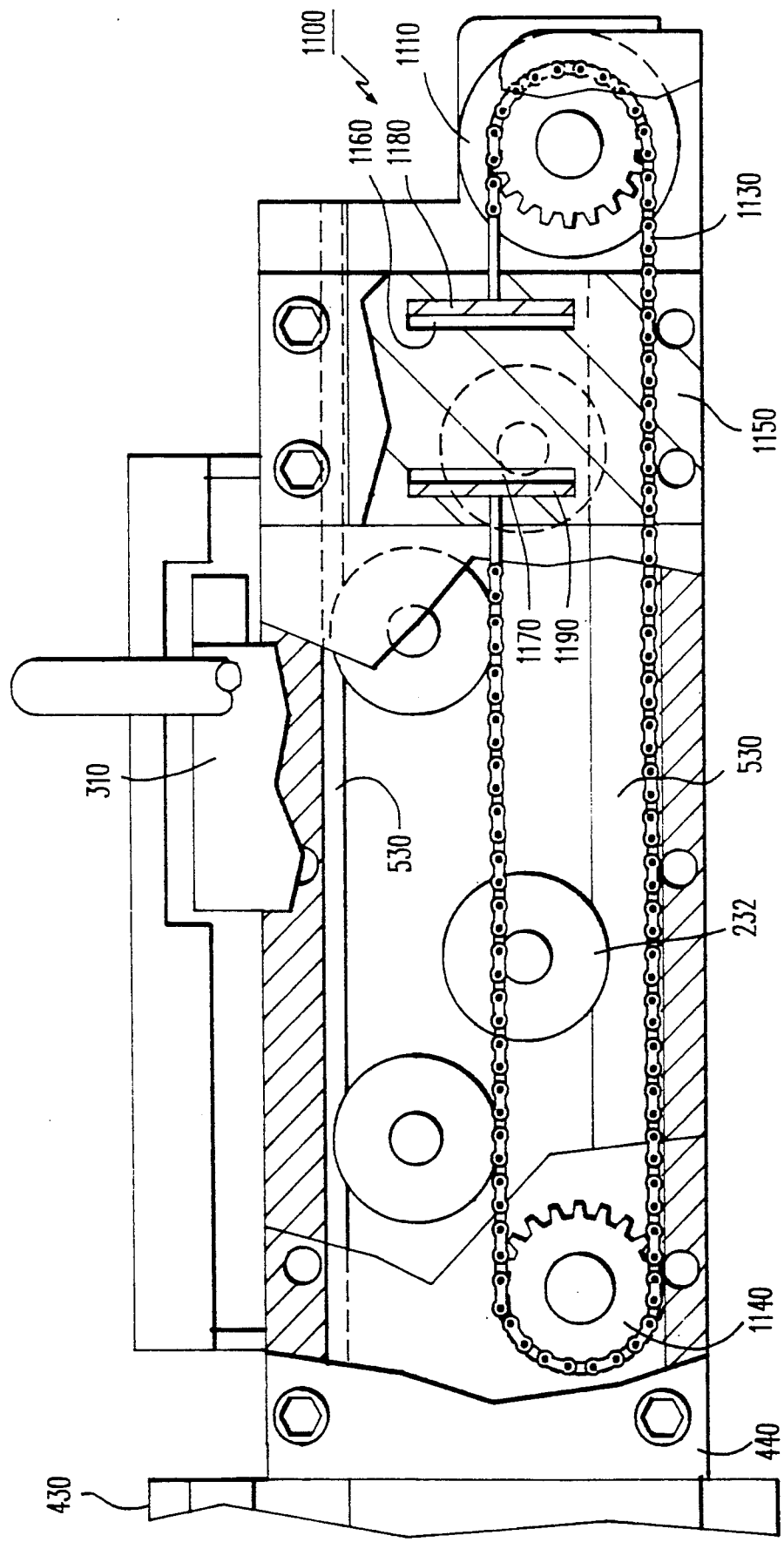
FIG. 23 is a view of the carriage biasing assembly in partial vertical section illustrating pinion gears engaging the link chain for biasing the carriage.

Referring to FIGS. 20, 21, and 22, there is shown a second embodiment of the invention with parts removed for clarity. For example, track 100, bracket 310 and spool assembly 320 are not shown for purposes of clarity. However, the second embodiment of the invention is substantially similar to the first embodiment of the invention except that third motor 474, pinion gear 472, and gear rack 470 have been removed and replaced by a carriage biasing assembly. The carriage biasing assembly comprises a rear motor 1110 attached to roller assembly 160 for biasing carriage 420 parallel to the longitudinal center axis of pipe portion 30. Rear motor 1110 includes a rotatable first sprocket wheel 1120 shaped to interlock with a link chain 1130 having two ends for reasons to be described presently. Connected to roller assembly 160 is a rotatable second sprocket wheel 1140 that also interlocks with link chain 1130. Integrally formed in a portion of carriage 420 between first sprocket wheel 1120 and second sprocket wheel is an anchor portion 1150 having a first chamber 1160 and a second chamber 1170 therein for substantially enclosing a first and a second anchor member 1180 and 1190, respectively. Each end of link chain 1130 is attached to its associated anchor member 1180 or 1190. Thus, anchor members 1180 and 1190 anchor each end of link chain 1130 to anchor portion 1150. As rear motor 1110 rotates, link chain 1130 will also rotate to a like extent due to the interlocking engagement of first sprocket wheel 1120 and rear motor 1110. It will be understood that as link chain 1130 rotates, carriage 420 will be biased parallel to the longitudinal center axis of pipe portion 30 because each end of link chain 1130 is connected to anchor portion 1150 which is integrally formed in carriage 420. It will be appreciated that removing third motor 474, pinion gear 472, and gear rack 470 reduces the vertical profile of apparatus 55 so that apparatus 55 may be located in a confined area where the space radially surrounding pipe portions 30 and 40 is limited.

OPERATION

During operation, apparatus 55 precisely welds a joint or seam defined by the interface of abutting pipe end portions 50 and 60 that may reside in a confined space. Track 100 may be disposed around first pipe portion 30 near pipe end portion 50 for welding the joint or seam. Track 100 is disposed around pipe end portion 50 by abutting the ends of track sections 115a/115b and by using fasteners 120 to fasten the abutting ends of track sections 115a/115b together. Positioners 150 may then be so that positioners 150 secure track 100 to pipe end portion 50. It is preferable that positioners 150 are adjusted such that bearing surface 110, which supports apparatus 55, is everywhere equidistant from land 59. After track 100 is suitably secured to track 100, apparatus 55 may be placed on track 100 for precisely welding the joint or seam.

Apparatus 55 is connected to track 100 by pivoting clamps 240a/240b inwardly towards track 100 and then attaching clamps 240a and 240b to frame 165 by using attachment pins 300. When clamps 240a and 240b are thus attached to frame 165, low-friction rollers 250 will be brought into abutment with second bearing surface 142 and third bearing surface 144 for securely resting apparatus 55 on track 100. Moreover, as apparatus 55 rests on track 100, the nodules or protuberances on the surface of first roller 170 and second roller 180 will grippingly contact first bearing surface 110 to assist in maintaining apparatus 55 stationary on track 100 until rollers 170 and 180 are operated. Electrical power is supplied from a power source, such as power supply 1050, to second motor 360 for translating carriage 420 along and axis parallel to the longitudinal center axis of first pipe portion 30. Carriage 420 will translate along an axis parallel to the longitudinal center axis of pipe portion 30 due to the engagement of pinion gear 472 with gear rack 470 and due to the sliding engagement of rails 520, 530, 540 and 550 with wheels 232. That is, as gear 238 translates carriage 420, rails 520, 530, 540, 550 will slide in grooves 234 which are circumferentially formed in each wheel 232. Thus, it will be appreciated that grooves 234 assist in precisely guiding carriage 420 along an axis parallel to the longitudinal center axis of pipe portion 30. Because electrode housing 56 and electrode 57 are connected to carriage 420, electrode housing 56 and electrode 57 are likewise precisely guided along the longitudinal axis of pipe portion 30 as carriage 420 is precisely guided along an axis parallel to the longitudinal center axis of pipe portion 30. In this manner, electrode housing 56 and electrode 57 are precisely translated to the joint or seam to be welded.

Electrical power is supplied from power supply 1050 to fourth motor 660 for operating fourth motor 660. Operation of fourth motor 660 rotates chain 650. As chain 650 rotates, sprocket wheel 640 rotates thereby rotating lead screw 600. It will be appreciated that rotation of lead screw 600 translates elevator platform 670 because lead screw 600 threadably engages bore 680 formed in elevator platform 670. Because elevator platform 670 is connected to electrode housing 56, translation of elevator platform 670 also translates electrode housing 56. Thus, electrode housing 56 and electrode 57 precisely translate in a direction that is perpendicular to the longitudinal center axis of first pipe portion 30 and second pipe portion 40 for precisely bringing electrode housing 56 and electrode 57 to the joint or seam to be welded.

Electrode housing 56 and electrode 57 may be further precisely positioned for welding the joint. As stated hereinabove, electrode housing 56 is connected to attachment plate 700 because male connector 710 is slidably received in hole 730 belonging to female connector 720. Thus, fine adjustment of electrode housing 56 with respect to the joint may be obtained by sliding female connector along male connector 710. Moreover, electrode housing 56 may be further adjusted with respect to the joint by pivoting electrode housing 56 radially about male connector 610. In addition, electrode housing 56 is further finely adjustable with respect to the joint by pivoting electrode housing 56 radially about swivel pin 875.

Therefore, as described hereinabove, precise positioning of electrode housing 56, and thus electrode 57, with respect to the joint to be welded is obtainable by a series or sequence of gross and fine adjustments. That is, track 100 is placed around pipe end portion 50 near the weld site (e.g., the interface of pipe end portions 50 and 60). Apparatus 55 is secured to track 100. If necessary, first motor 210 may then be operated to roll apparatus 55, and thus electrode housing 56 and electrode 57, to the site where welding is to begin. If required, second motor 360 is operated to advance carriage 420, and thus advance electrode housing 56 and electrode 57, to near the weld site. Next, if required, electrode housing 56 may be slid along male connector 710 to precisely position electrode housing 56 and electrode 57 to within a predetermined distance of the weld site. Thereafter, third motor 660 may be operated to translate electrode housing 56 and electrode 57 to the weld site. If further fine adjustment is necessary, electrode housing 56 and thus electrode 57 may be radially pivoted about male connector 710. Additional fine adjustment of electrode housing 56 and thus electrode 57 is obtainable by pivoting electrode housing 56 and thus electrode 57 radially about swivel pin 875. Precisely positioning electrode housing 56 and thus electrode 57 in the manner described hereinabove provides a method for precisely welding a joint or seam between abutting pipe end portions 50 and 60 so that a quality weld is obtained in a reasonable time.

However, the precise placement of the filler wire with respect to electrode 57 and weld puddle is also important for obtaining a suitable filler wire entry angle to produce a quality weldment in a reasonable time. As stated hereinabove, filler wire 335 is slidably received through tube 830. Tube 830 is slidably held in holder 820 and therefore tube 830 can be slidably positioned within holder 820 so that filler wire 335 can be precisely positioned or disposed near the weld site. Holder 820 itself can be pivoted about holder pin 850 for precisely positioning the tip portion of filler wire 335 in the shielding gas and near the weld site. Holder pin 850 connects holder 820 to first end portion 810 of shaft 800. Therefore, shaft 800 may be rotated by turning handle 890 so that filler wire 335 can be precisely positioned in the shielding gas near the weld site. Shaft 800 also can be translated in sleeve 790 by rotating nut 870. Translating shaft 800 vertically moves holder 820 and thus filler wire 335 to near the weld site. Fourth motor 360 is operated to advance or retract filler wire 335 through tube 830.

During or after the required adjustments described hereinabove are made, the electric arc may be initiated. Power supply 1050 is operated to supply electricity to electrical contact 100, which in turn conducts the electricity to electrode 57 for generating an electric arc between the weld site and the electrode. Moreover, power supply 1050, which receives shielding gas from gas reservoir 1060, regulates the flow of the shielding gas into first conduit 1040. The shielding gas flows through first conduit 1040 and into central bore 930 and thence through screen 990. The shielding gas is then directed and confined around electrode 57 and the weld puddle by gas cup 1010. Holder 820 and thus filler wire 335 will have been prepositioned, in the manner described hereinabove, such that the tip of filler wire 335 resides in the shielding gas and near the weld site for obtaining a quality weldment.

Power supply 1050 is also operated to supply coolant, such as water, to second conduit 1090. Second conduit 1090 conducts this coolant to the annular second channel for cooling insert 900. The coolant flowing through the second channel is returned to power supply 1050 through third conduit 1092. In this manner, the amount of coolant needed for the method of the invention is conserved because the coolant is continuously recirculated by power supply 1050 through second conduit 1090, through the annular second channel, and through third conduit 1092.

As stated hereinabove, electrode 57, which may be 98% tungsten and 2% thorium, is preferably a non-consumable electrode. However, if necessary, electrode 57 may be removed from electrode housing 56 and exchanged for a different electrode (e.g., an electrode of a different composition or of a different diameter or length). Electrode 57 may be removed from electrode housing 56 by unscrewing cap 960 from the female portion 940 of central bore 930 formed in electrode housing 56. As described hereinabove, cap 960 includes vice 970 which has the plurality of fingers 980 for securely gripping electrode 57. Because electrode 57 is grippingly secured to cap 960 by the fingers 980 of vice 970, electrode 57 will be removed from electrode housing 56 as cap 960 is removed from electrode housing 56. A cap having a different electrode may then be threadably inserted into female portion 940 of central bore 930.

A stated hereinabove, first motor 210 is activated to operate rollers 170 and 180 for rolling apparatus 55 around track 100 so that the entire circumferential seam defined by the abutting ends of pipe end portions 50 and 60 is welded. The nodules or protuberances on the surface of each roller 170 and 180 will grippingly engage first bearing surface 110 for providing traction as apparatus 55 rolls around track 100.

It will be understood that operation of the second embodiment of the invention is substantially similar to the operation of the first embodiment of the invention except that rear motor 110 is operated to drive link chain 1130 for biasing carriage 420 along an axis parallel to the longitudinal center axis of pipe portions 30 and 40.

While the invention has been described in connection with specific embodiments thereof, it will be understood that it is capable of further modifications. For example, electrode housing 56 may be replace by an electric discharge machining apparatus suitable for cutting a workpiece. Indeed, the claims are intended to cover any variations, uses or adaptations of the invention following, in general, the principles of the invention, and including such departures from the present disclosure as come within known and customary practice within the art to which the invention pertains.

Therefore, provided herein are an arc welding apparatus and method for precisely welding a joint or seam between abutting pipe portions that may reside in a confined space.

What is claimed is:

1. An apparatus for welding a joint between abutting circular workpieces defining a longitudinal center axis through the workpieces, the apparatus having an electrode for welding the joint, comprising:
   (a) housing means connected to the electrode for housing the electrode;
   (b) biasing means connected to said housing means for biasing said housing means along an axis perpendicular to the longitudinal axis of the workpiece;
   (c) carrier means connected to said housing means for carrying said housing means along an axis always parallel to the longitudinal axis of the workpieces;
   (d) adjustable guide means circumscribing one of the workpieces for precisely guiding said apparatus around the workpiece circumscribed by said guide means, said guide means being adjustable for maintaining a constant distance between the workpiece and the electrode for minimizing risk of arc blow; and
   (e) roller means connected to said carrier means and engaging said guide means for rolling said apparatus around the longitudinal axis of the workpieces, said roller means adapted for grippingly engaging said guide means, such that said apparatus will remain stationary except when said roller means is operated.

2. The apparatus according to claim 1, further comprising adjustable manipulator means connected to said housing means for manipulating filler wire, said manipulator means including:
   (a) a shaft slidably extending through said housing means, said shaft having a first end portion and an externally threaded second end portion;
   (b) a nut rotatably anchored to said housing means, said nut having a threaded bore therethrough threadably engaging the external threads of said shaft, whereby said shaft is biased along its longitudinal axis as said nut is rotated; and
   (c) a guide tube pivotally connected to the first end portion of said shaft for receiving the filler wire through said guide tube and for guiding the filler wire towards the electrode.

3. A welding apparatus for welding a joint between abutting pipe end portions defining a longitudinal center axis through the pipe portions, the apparatus having an electrode extending therefrom for welding the joint, comprising:
   (a) an electrode housing for housing the electrode, said electrode housing having a first bore therethrough;
   (b) a lead screw assembly connected to said electrode housing for biasing said electrode housing along an axis perpendicular to the longitudinal axis of the pipe portions;
   (c) a carriage connected to said electrode housing for carrying said electrode housing along an axis always parallel to the longitudinal axis of the pipe portions;
   (d) a roller assembly connected to said carriage and engaging said track for rolling said apparatus around the longitudinal axis of the pipe portions, said roller assembly adapted for grippingly engaging said track, such that said apparatus will remain stationary except when said roller assembly is operated;
   (e) a track circumscribing one of the pipe portions for guiding said roller assembly therearound; and
   (f) a plurality of spaced-apart adjustable positioners integrally attached to said track for securing said track to the pipe portion circumscribed by said track, said positioners being adjustable for maintaining a constant distance between the pipe portions and the electrode for minimizing risk of arc blow.

4. The apparatus according to claim 3, wherein said carriage comprises:
   (a) a motor;
   (b) a gear rack attached to said carriage; and
   (c) a pinion gear rotatably connected to said motor and engaging said gear rack, said pinion gear capable of being rotated by said motor, whereby said carriage is biased as said pinion gear rotatably engages said gear rack.

5. The apparatus according to claim 4, wherein said lead screw assembly comprises:
   (a) an externally threaded lead screw rotatably connected to said carriage;
   (b) means engaging said lead screw for rotating said lead screw; and
   (c) an elevator platform having a threaded bore therethrough threadably engaging the external threads of said lead screw for biasing said elevator platform along an axis perpendicular to the longitudinal axis of the pipe portions, said elevator platform attached to said electrode housing, whereby said elevator platform and said electrode housing are simultaneously biased as said lead screw rotates.

6. The apparatus according to claim 5, further comprising an adjustable manipulator arm adjustable connected to said electrode housing for manipulating filler wire, said manipulator arm including;
   (a) a shaft slidably extending through the first bore of said electrode housing, said shaft having a first end portion having a polygonal transverse cross section and having an externally threaded second end portion;
   (b) a nut rotatably anchored to said electrode housing, said nut having a threaded bore therethrough threadably engaging the external threads of said shaft, whereby said shaft is biased along its longitudinal axis in the first bore as said nut is rotated;
   (c) a sleeve rotatably matingly disposed in the first bore of said electrode housing for rotating said shaft, said sleeve defining a longitudinal polygonal-shaped hole therethrough for slidably matingly receiving the first end portion of said shaft;
   (d) a handle attached to said sleeve for rotating said sleeve, whereby said shaft rotates as said sleeve is rotated by said handle; and
   (e) a guide tube pivotally connected to the first end portion of said shaft for receiving the filler wire through said guide tube and for guiding the filler wire towards the electrode.

7. The apparatus according to claim 3, wherein said carriage comprises:
   (a) a rear motor oriented for reducing the vertical profile of said apparatus, so that said apparatus is operable in confined areas;
   (b) a link chain attached to said carriage; and
   (c) a sprocket wheel rotatably connected to said motor and engaging said link chain, said sprocket wheel capable of being rotated by said rear motor, whereby said carriage is biased as said sprocket wheel rotatably engages said link chain.

8. An arc welding apparatus for precisely welding a circumferential joint defined by abutting pipe end portions defining a longitudinal center axis through the pipe end portions, the apparatus having an electrode extending therefrom for supplying heat to fuse the joint, comprising:
   (a) an electrode housing for housing the electrode, said electrode housing having a first bore therethrough;
   (b) a heat resistant insert formed of phenolic material capable of withstanding high temperatures, said insert disposed in said housing, said insert having an outside surface and having;
      (i) a central bore therethrough, the central bore having a threaded first end portion;
      (i) a first channel extending from the outside surface of said insert to the central bore for conducting a shielding gas through the first channel and to the central bore; and
      (iii) an annular second channel formed through said insert and extending around the central bore for conducting a coolant through the second channel for cooling said insert;
   (c) a threaded cap threadably engaging the first end portion of the central bore for closing the first end portion of the central bore, said cap having a plurality of fingers extending into the central bore for securely gripping the electrode;
   (d) a gear driven carriage connected to said electrode housing for precisely carrying said electrode housing, said carriage including:
      (i) a face plate;
      (ii) a first leg attached to said face plate, said first leg disposed perpendicular to said face plate and extending outwardly therefrom;
      (iii) a second leg attached to said face plate, said second leg disposed perpendicular to said face plate and extending outwardly therefrom parallel to said first leg, said second leg having an upper surface thereon;
      (iv) a gear rack attached to the upper surface of said second leg;
      (v) an elongated first rail attached to said first leg and extending therealong;
      (vi) an elongated second rail attached to said second leg and extending therealong, said second rail disposed parallel to said first rail;
      (vii) a motor connected to said electrode housing; and
      (viii) a pinion gear rotatably connected to said motor and engaging said gear rack for biasing said carriage, said motor capable of rotating said pinion gear, whereby said carriage is slidably biased on said first rail and said second rail as said pinion gear rotatably engages said gear rack;
   (e) a lead screw assembly connected to said electrode housing for precisely biasing said electrode housing along an axis perpendicular to the longitudinal center axis of the pipe portions, said lead screw assembly including:
      (i) a lead screw rotatably connected to said carriage, said lead screw having external threads and having a sprocket wheel attached thereto and extending therearound for precisely rotating said lead screw;
      (ii) a chain engaging the sprocket wheel for precisely rotating the sprocket wheel;
      (iii) rotating means connected to said carriage and engaging said chain for rotating the sprocket wheel, whereby said lead screw precisely rotates as said rotating means rotates said chain; and
      (iv) an elevator platform attached to said electrode housing, said elevator platform having a threaded bore therethrough threadably engaging the external threads of said lead screw, whereby said elevator platform and said electrode housing are precisely simultaneously biased as said lead screw rotates;
   (f) a roller assembly slidably connected to said first rail and said second rail for slidably precisely biasing said carriage around the longitudinal center axis of the pipe portions; and (g) an adjustable manipulator arm adjustably connected to said electrode housing for precisely manipulating filler wire, said manipulator arm including:
   (i) an elongated shaft extending through the first bore of said electrode housing, said shaft having a first end portion having a polygonal transverse cross section and having an externally threaded second end portion;
   (ii) a nut rotatably anchored to said electrode housing, said nut having a threaded bore therethrough threadably engaging the external threads of said shaft, whereby said shaft is precisely biased along its longitudinal axis as said nut is rotated;
   (iii) a cylindrical sleeve disposed in the first bore of said electrode housing for rotating said shaft, said sleeve having a longitudinal polygonal-shaped hole therethrough for slidably matingly receiving the first end portion of said shaft;
   (iv) an elongated handle attached to said sleeve for rotating said sleeve;
   (v) a connector pivotally attached to the first end portion of said shaft, said connector having an aperture therethrough; and
   (vi) a guide tube extending through the aperture of said connector for receiving the filler wire through the guide tube and for precisely guiding the filler wire towards the electrode.

9. A method for arc welding a joint between abutting pipe portions defining a longitudinal center axis through the pipe portions, comprising the steps of:
   (a) removably positioning a track around one of the pipe portions for guiding an electrode housing around the joint; and
   (b) removably securing a roller assembly to the track, the roller assembly having an outer textured surface for grippingly engaging the track, such that the electrode housing will remain stationary except when the roller assembly is operated, and having a carriage slidably connected thereto for carrying electrode housing, the carriage having a lead screw assembly connected to the carriage and to the electrode housing for biasing the electrode housing.

10. The method according to claim 9, further comprising the steps of:
   (a) operating the roller assembly for biasing the carriage around the longitudinal axis of the pipe portions; and
   (b) operating the lead screw assembly for biasing the electrode assembly along an axis perpendicular to the longitudinal axis of the pipe portions.

11. The method according to claim 10, further comprising the step of manipulating filler wire.

12. The method according to claim 10, further comprising the step of operating the roller assembly for rolling the roller assembly around the track.

* * * * *